US009154582B2

(12) United States Patent
Ueda

(10) Patent No.: US 9,154,582 B2
(45) Date of Patent: Oct. 6, 2015

(54) DISTRIBUTION SYSTEM AND DISTRIBUTION SERVER

(71) Applicant: PANASONIC INTELLECTUAL PROPERTY MANAGEMENT CO., LTD., Osaka-shi, Osaka (KR)

(72) Inventor: Hisataka Ueda, Osaka (JP)

(73) Assignee: PANASONIC INTELLECTUAL PROPERTY MANAGMENT CO. LTD., Osaka (JP)

( * ) Notice: Subject to any disclaimer, the term of this patent is extended or adjusted under 35 U.S.C. 154(b) by 230 days.

(21) Appl. No.: 13/773,659

(22) Filed: Feb. 22, 2013

(65) Prior Publication Data
US 2013/0238688 A1 Sep. 12, 2013

(30) Foreign Application Priority Data

Mar. 9, 2012 (JP) ................................. 2012-052664
Dec. 3, 2012 (JP) ................................. 2012-264529

(51) Int. Cl.
G06F 15/16 (2006.01)
H04L 29/06 (2006.01)
H04L 29/08 (2006.01)

(52) U.S. Cl.
CPC .............. *H04L 67/42* (2013.01); *H04L 67/325* (2013.01)

(58) Field of Classification Search
None
See application file for complete search history.

(56) References Cited

U.S. PATENT DOCUMENTS

| 6,314,576 | B1* | 11/2001 | Asamizuya et al. | 725/91 |
| 8,796,528 | B2* | 8/2014 | Uehara et al. | 84/645 |
| 2002/0129374 | A1* | 9/2002 | Freeman et al. | 725/91 |
| 2004/0073936 | A1* | 4/2004 | Kurauchi | 725/90 |
| 2004/0179816 | A1 | 9/2004 | Takehana | |
| 2008/0109557 | A1* | 5/2008 | Joshi et al. | 709/231 |

FOREIGN PATENT DOCUMENTS

JP 2004-274627 A 9/2004

* cited by examiner

*Primary Examiner* — Mohamed Ibrahim
(74) *Attorney, Agent, or Firm* — Shinjyu Global IP

(57) ABSTRACT

The present distribution system is formed by a plurality of clients enabled to receive a plurality of channels of signals and a distribution server enabled to output the plurality of channels of signals to respective clients. Each of the plurality of clients includes a switch unit and a transmission unit. The distribution server includes a plurality of transceiver units, a delay amount determining unit and a delay adjusting unit. The respective transceiver units output the plurality of channels of signals to the plurality of clients and receive selection information and dependent information from the respective plurality of clients. The delay amount determining unit determines delay amount to be instructed to the respective plurality of transceiver units based on the dependent information. The delay adjusting unit controls delay amount for the respective plurality of transceiver units based on the delay amount determined by the delay amount determining unit.

15 Claims, 21 Drawing Sheets

| CLIENT NAME | POST-SWITCHING SIGNAL | SWITCH CLOCK TIME |
|---|---|---|
| 21 | ORIGINAL SIGNAL 1 | CLOCK TIME T0 |
| 21 | ORIGINAL SIGNAL 2 | CLOCK TIME T1 |
| 21 | ORIGINAL SIGNAL 1 | CLOCK TIME T3 |
| 21 | ORIGINAL SIGNAL 2 | CLOCK TIME T4 |

FIG. 10

| CLIENT NAME | POST-SWITCHING SIGNAL | SWITCH CLOCK TIME |
|---|---|---|
| 21 | ORIGINAL SIGNAL 1 | CLOCK TIME T0 |
| 21 | ORIGINAL SIGNAL 2 | CLOCK TIME T1 |
| 21 | ORIGINAL SIGNAL 1 | CLOCK TIME T3 |
| 21 | ORIGINAL SIGNAL 2 | CLOCK TIME T4 |
| 22 | CLIENT 21 | CLOCK TIME T0 |
| 22 | ORIGINAL SIGNAL 1 | CLOCK TIME T4 |
| 22 | ORIGINAL SIGNAL 2 | CLOCK TIME T5 |
| 23 | CLIENT 21 | CLOCK TIME T0 |
| 23 | ORIGINAL SIGNAL 1 | CLOCK TIME T2 |
| 23 | CLIENT 22 | CLOCK TIME T4 |

FIG. 12

| POST-SWITCHING SIGNAL | SWITCH CLOCK TIME |
|---|---|
| ORIGINAL SIGNAL 1 | CLOCK TIME T0 |
| ORIGINAL SIGNAL 2 | CLOCK TIME T1 |
| ORIGINAL SIGNAL 1 | CLOCK TIME T2 |
| ORIGINAL SIGNAL 1 | CLOCK TIME T4 |
| ORIGINAL SIGNAL 2 | CLOCK TIME T5 |

FIG. 13

DISTRIBUTION SYSTEM AND DISTRIBUTION SERVER

CROSS-REFERENCE TO RELATED APPLICATIONS

This application claims priority under 35 U.S.C. §119 to Japanese Patent Application No. 2012-052664 filed on Mar. 9, 2012 and Japanese Patent Application No. 2012-264529 filed on Dec. 3, 2012. The entire disclosures of Japanese Patent Application No. 2012-052664 and Japanese Patent Application No. 2012-264529 are hereby incorporated herein by reference.

BACKGROUND

1. Field of the Invention

The present invention relates to a distribution system and a distribution server for preventing distribution of an inappropriate video signal and/or an inappropriate audio signal through task-sharing and task-check by a plurality of workers in executing distribution of a video signal and/or an audio signal selected from a plurality of channels of video signals and/or a plurality of channels of audio signals.

2. Description of the Related Art

In recent years, devices have been popular that record a set of video data and/or a set of audio data in a file format into a randomly accessible recording medium (e.g., an optical disc, a semiconductor memory, etc.). For example, even in broadcasting stations and audio/video distribution companies, editing devices including such recording media have been used for executing editing tasks of a video signal and/or an audio signal.

On the other hand, audio and video of an event and etc., and edited audio and video have been distributed and transmitted using a communication network, a broadcasting network and etc. It takes some time to execute an editing task with a video signal processing. Therefore, when propriety is placed on instantaneousness, real-time distribution and real-time broadcasting are executed while an editing task is executed using a switcher device of a video signal and/or an audio signal, a distribution/broadcasting device of a video signal and/or an audio signal, and etc. For example, when a worker herein erroneously executes a switching operation, an inappropriate video signal and/or an inappropriate audio signal may be unexpectedly distributed.

A technology of creating a playlist based on a selection signal of a switcher has been disclosed as a method of efficiently executing such editing and checking tasks. For example, Japan Laid-Open Patent Application Publication No. JP-A-2004-274627 discloses a technology that a playlist is created based on a user's switch operation and is referred as an aid in executing an editing task.

However, the conventional configuration disclosed in the publication has drawbacks in executing distribution using a communication network or a broadcasting network. For example, it is difficult to check whether or not a switching operation is executed without errors and whether or not an appropriate signal is distributed, and if any, to modify an erroneous operation and inappropriate signal before distribution or transmission thereof.

In view of the aforementioned drawback, the present invention is intended to provide a distribution system and a distribution server whereby a switch operation or an editing task can be shared by a plurality of workers and can be easily checked and modified for preventing a worker from erroneously executing a switch operation and for achieving better distribution of a video signal and/or an audio signal.

SUMMARY

A distribution system of the present invention is formed by a plurality of clients enabled to receive a plurality of channels of signals and a distribution server enabled to output the plurality of channels of signals to the respective plurality of clients. Each of the plurality of clients includes a switch unit and a transmission unit. The switch unit is configured to select one from the plurality of channels of signals and output the selected signal. The transmission unit is configured to transmit a piece of selection information regarding the selected signal and a piece of dependent information representing dependency among the plurality of clients to the distribution server. The distribution server includes a plurality of transmitting and receiving units, a delay amount determining unit and a delay adjusting unit. The respective transmitting and receiving units are configured to output the plurality of channels of signals to the plurality of clients and receive pieces of selection information and pieces of dependent information from the respective plurality of clients. The delay amount determining unit is configured to determine delay amounts of the respective plurality of transmitting and receiving units based on the pieces of dependent information. The delay adjusting unit is configured to execute delay amount controls for the respective plurality of transmitting and receiving units based on the delay amounts determined by the delay amount determining unit.

Advantageous Effects of Invention

With the aforementioned configuration, the distribution system and the distribution server of the present invention enables a plurality of workers to easily check and modify a switch operation or an editing task shared by them in order to prevent a worker from erroneously execute a switch operation and execute better distribution of a video signal and/or an audio signal.

BRIEF DESCRIPTION OF THE DRAWINGS

Referring now to the attached drawings which form a part of this original disclosure:

FIG. 10 is a diagram showing a specific example of a switch information list of a client in the distribution system 1;

FIG. 12 is a diagram showing a specific example of a switch information list for all the switch operations in the distribution system 1;

FIG. 13 is a diagram showing a specific example of a piece of server selection signal information in the distribution system 1;

DETAILED DESCRIPTION

Exemplary embodiments will be hereinafter explained with reference to attached drawings. It will be apparent to those skilled in the art from this disclosure that the following descriptions of the embodiments are provided for illustration only and not for the purpose of limiting the invention as defined by the appended claims and their equivalents.

Exemplary Embodiment 1

1. Configuration of Distribution System

Figure 1:
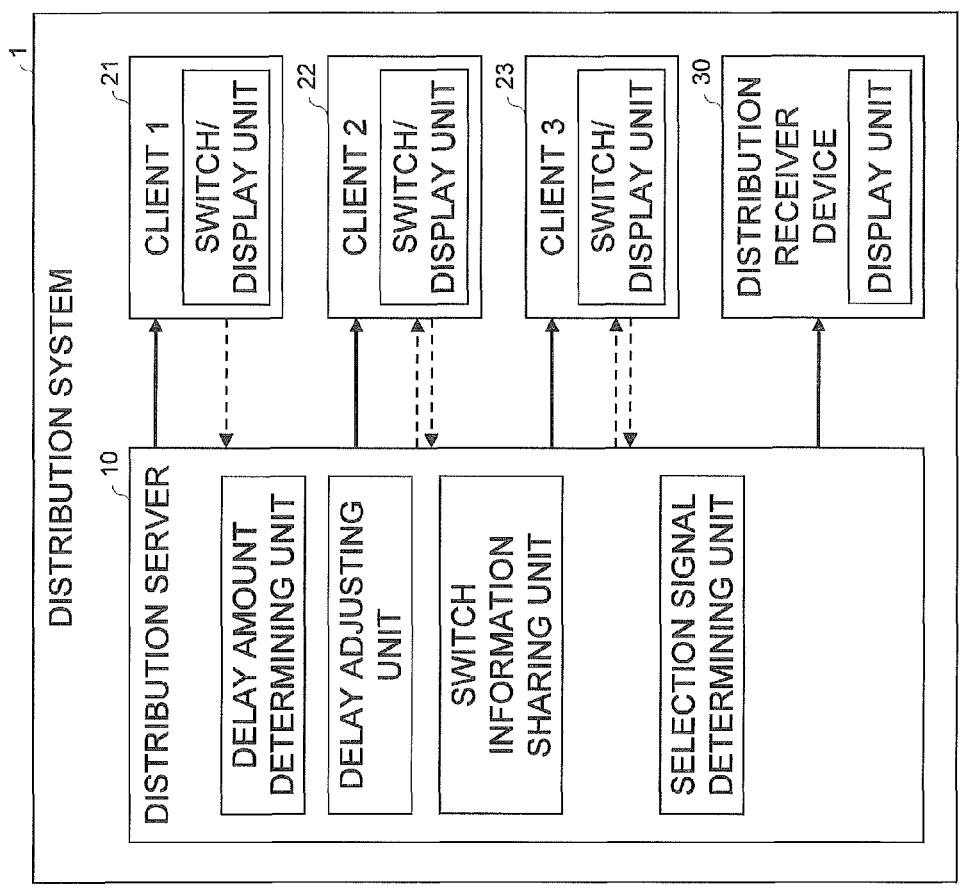
FIG. 1 is a block diagram showing a configuration of a distribution system in an exemplary embodiment 1.

FIG. 1 is a block diagram showing a configuration of a distribution system in an exemplary embodiment 1. As shown in FIG. 1, a distribution system 1 includes a distribution server 10, a plurality of clients 21, 22 and 23 and a distribution receiver device 30.

The distribution server 10 is a server for distributing one selected from a plurality of channels of signals (e.g., a video signal and/or an audio signal) inputted thereto. The distribution server 10 is connected to the plurality of clients 21, 22 and 23 and the distribution receiver device 30. The distribution server 10 is configured to provide the respective plurality of clients 21, 22 and 23 with the plurality of channels of delayed signals. Each of the clients 21, 22 and 23 is configured to select any one from the plurality of channels of signals based on a user's operation and provide the distribution server 10 with a piece of switch information regarding the selection (exemplary selection information). The distribution server 10 is configured to provide the distribution receiver device 30 with the signals determined by the respective clients 21, 22 and 23 based on the pieces of selection information provided thereto from the respective clients 21, 22 and 23.

The distribution receiver device 30 is a device configured to receive the signals provided thereto from the distribution server 10 and display and output the received signals. Specifically, the distribution receiver device 30 is set as a video monitor for displaying a video signal and/or a speaker for converting an audio signal into a sound.

In the exemplary embodiment 1, an object of the respective clients 21, 22 and 23 and that of the distribution receiver device 30 are herein different from each other. The clients 21, 22 and 23 are devices for allowing a plurality of workers to execute checking and editing tasks (e.g., a switch operation) and etc. On the other hand, the distribution receiver device 30 is a device for displaying results of the checking and editing tasks the clients. In other words, the respective clients 21, 22 and 23 and the distribution receiver device 30 are different from each other regarding the number of channels of signals to be inputted and existence/inexistence of a switch unit configured to select one from a plurality of channels of signals. Each of the clients 21, 22 and 23 includes a switch unit configured to input a plurality of channels of signals and select one from the plurality of channels of signals.

The term "(signal) channel" refers to a unit of a signal selected by the respective clients 21, 22 and 23. For example, when two signal channels are provided, this means that one can be arbitrarily selected from signals in two signal channels in the respective clients 21, 22 and 23. A plurality of signal channels or a plurality of channels of signals will be hereinafter referred to as a signal group.

For example, the distribution system 1 is utilized as a system for executing real-time distribution/transmission of a video signal and/or an audio signal or an editing system for executing an editing task for a signal on a real-time basis in a concert, an event and etc. However, in such real-time distribution and editing task, chances are that an inappropriate signal is inevitably distributed against a user's intension due to an erroneous operation of a worker, an accident, insufficient check and etc.

In view of the above, to prevent distribution of such inappropriate signal, the distribution system 1 of the present invention is configured such that checking and editing tasks are executed by a plurality of workers and an appropriate one is selected from the plurality of editing results. Accordingly, it is possible to provide means for finally generating an appropriate editing result or an appropriate distribution signal. The term "signal" herein refers to a generic term of signals including a video signal, an audio signal and etc. In the exemplary embodiment 1, explanation will be provided for an example that signals are a video signal and an audio signal.

Figure 2:
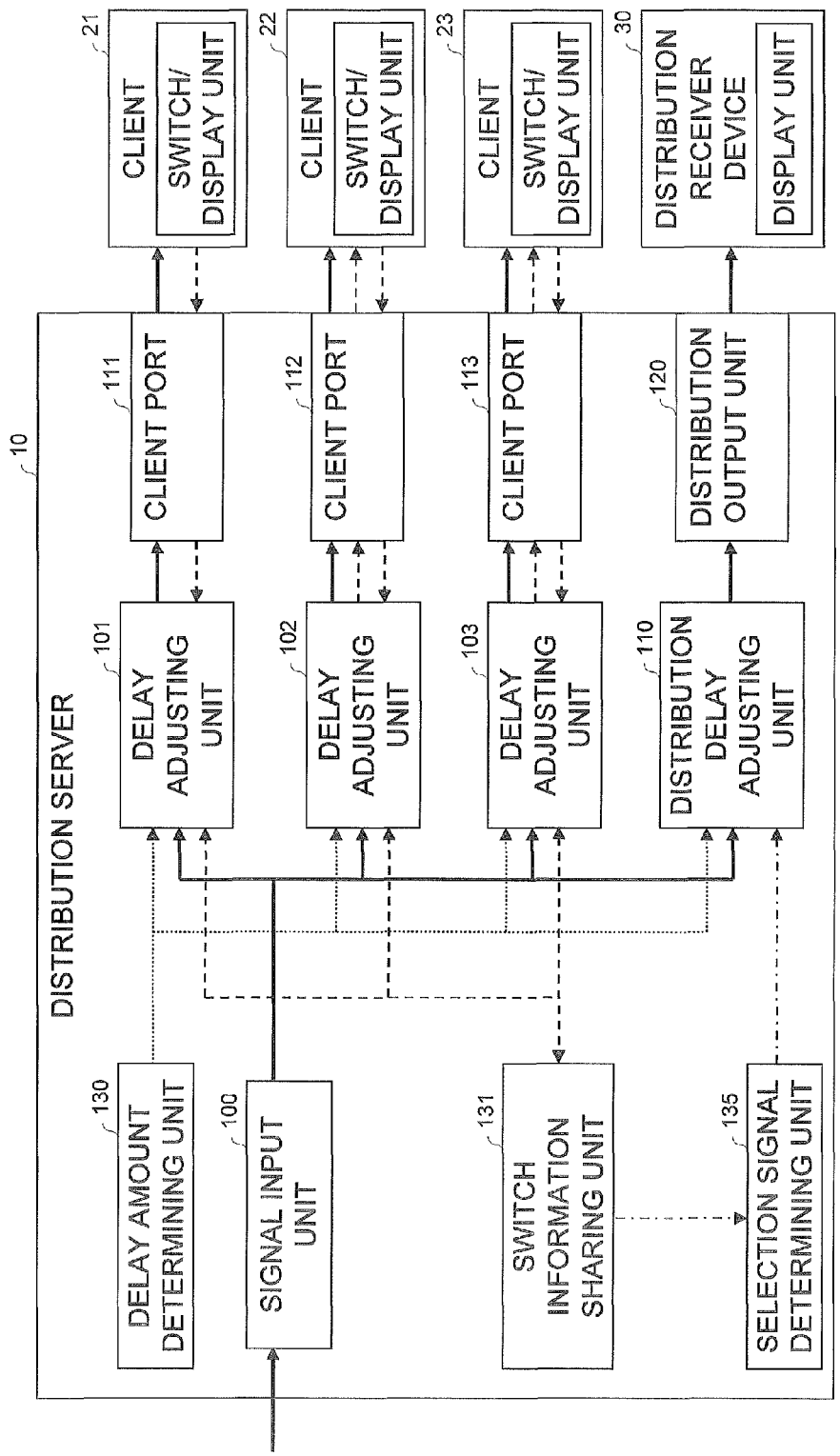
FIG. 2 is a block diagram showing a configuration of a distribution server in the distribution system 1.

FIG. 2 is a block diagram showing a more specific configuration of the distribution server 10. The distribution server 10 includes a signal input unit 100, a plurality of delay adjusting units 101, 102 and 103, a distribution delay adjusting unit 110, a plurality of client ports 111, 112 and 113 (exemplary transmitting and receiving units), a distribution output unit 120, a delay amount determining unit 130, a switch information sharing unit 131 and a selection signal determining unit 135. The delay adjusting units 101, 102 and 103 are herein respectively connected to the clients 21, 22 and 23 through the client ports 111, 112 and 113. In other words, the distribution server 10 shown in FIG. 2 is configured to execute a delay processing and a connection-related processing for three channels on a channel basis. Channels in the delay adjusting units 101, 102 and 103 and the client ports 111, 112 and 113 are hereinafter referred to as processing channels.

The signal input unit 100 is a block for inputting a signal group into the distribution server 10. For example, a video signal and an audio signal may be handled as a single signal channel regarding each signal (signal channel) in a signal group. Alternatively, a video signal may be handled as a single signal channel. Yet alternatively, an audio signal may be handled as a single signal channel.

Further, the signal input unit 100 is configured to provide the delay adjusting units 101, 102 and 103 and the distribution delay adjusting unit 110 with the signal group inputted therein. The delay adjusting units 101, 102 and 103 are configured to delay the signal group provided thereto from the signal input unit 100 based on the respective pieces of delay control information provided thereto from the delay amount determining unit 130 and provide the client ports 111, 112 and 113 with the delayed signal group.

Further, the distribution delay adjusting unit 110 is a block for determining a server selection signal based on a piece of server selection signal information provided thereto from the selection signal determining unit 135. The term "server selection signal" herein refers to a signal to be outputted from the distribution output unit 120 (i.e., the distribution server 10) and refers to a signal selected from the signal group. In other words, the server selection signal is a signal to be provided to the distribution receiver device 30. Further, the term "server selection signal information" refers to a piece of information for generating a server selection signal (e.g., a piece of information regarding a switch operation clock time and a post-switching signal).

The distribution delay adjusting unit 110 is configured to determine a signal (i.e., a server selection signal) to be provided to the distribution output unit 120 from the signal group provided thereto from the signal input unit 100 based on the piece of server selection signal information provided thereto from the selection signal determining unit 135. Further, the distribution delay adjusting unit 110 is configured to delay the signal based on the piece of delay control information provided thereto from the delay amount determining unit 130 and provide the delayed signal to the distribution output unit 120.

The client ports 111, 112 and 113 are interfaces for connecting the distribution server 10 to the respective clients 21, 22 and 23. Each of the client ports 111, 112 and 113 is configured to provide a corresponding one of the clients 21, 22 and 23 with the signal group provided thereto from the corresponding one of the delay adjusting units 101, 102 and 103. Further, each of the client ports 111, 112 and 113 is configured to receive a piece of switch information from the corresponding one of the clients 21, 22 and 23. Each of the client ports 111, 112 and 113 is configured to provide a corresponding one of the clients 21, 22 and 23 with a piece of switch information of another client (i.e., a client different from a client corresponding to each client port) provided thereto from the switch information sharing unit 131.

It should be noted that, in the exemplary embodiment 1, a case is assumed that unique codes are allocated to respective signal/processing channels in a signal group. The exemplary embodiment 1 will be explained using an example that two signal channels, i.e., signal channels "ORIGINAL SIGNAL 1" and "ORIGINAL SIGNAL 2", for instance, are inputted into the signal input unit 100.

The delay amount determining unit 130 is a block for determining a logical connection order among the clients and the distribution receiver device based on inputs by users, and simultaneously, for determining the delay amounts of the respective delay adjusting units 101, 102 and 103. The delay amount determining unit 130 is configured to provide the respective delay adjusting units 101, 102 and 103 and the distribution delay adjusting unit 110 with the determined delay amounts as pieces of delay control information. Specific explanation will be provided below for the processing of determining the logical connection order among the respective clients 21, 22 and 23 and the distribution receiver device 30 and the processing of determining the delay amounts of the respective delay adjusting units 101, 102 and 103, which are executed by the delay amount determining unit 130.

Explanation will be hereinafter provided for a logical connection in the distribution system 1 of the exemplary embodiment 1. The term "logical connection (and logical connection order)" refers to a logical connection order among the respective clients 21, 22 and 23 and the distribution receiver device 30. A logical connection (and a logical connection order) is different from a physical connection order.

As shown in FIGS. 1 and 2, the physical connection form of the distribution system 1 is a parallel connection. For example, the distribution system 1 emulates a logical connection order as shown in FIG. 3 by controlling the delay amounts of the signal group (and signals) to be outputted from the distribution server 10 to the respective clients 21, 22 and 23 and the distribution receiver device 30.

Figure 3:
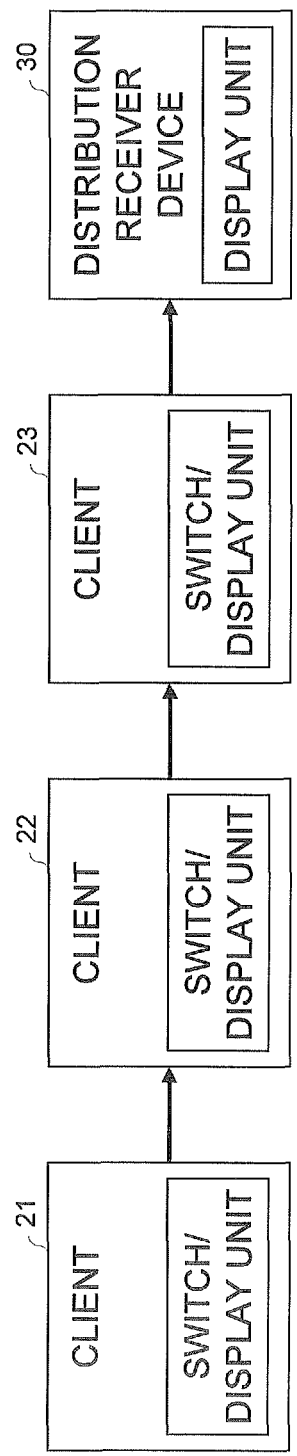
FIG. 3 is a diagram schematically showing a logical connection state of clients in the exemplary embodiment 1.

FIG. 3 is a diagram schematically showing a logical connection in the distribution system 1. In FIG. 3, the client 21, the client 22, the client 23 and the distribution receiver device 30 are logically connected in this order as depicted with arrows. The logical connection is implemented by causing the distribution server 10 to control the delay amounts of the signal group (and signals) to be outputted to the respective clients 21, 22 and 23 and the distribution receiver device 30 so that the delay amounts sequentially get larger in the order of the client 21, the client 22, the client 23 and the distribution receiver device 3. Through the delay control, signals to be displayed and outputted on the respective clients 21, 22 and 23 and the distribution receiver device 30 are sequentially shifted on a timeline. Therefore, in appearance, the respective signals are displayed and outputted as if they are sequentially connected.

The switch information sharing unit 131 is a block for managing pieces of switch information of the respective clients 21, 22 and 23. The term "switch information" herein refers to a piece of information regarding a timing (switch clock time) when signal selection (a switch operation) is executed and a selected signal (i.e., a post-switching signal). For example, a clock time of signal switching may be used as a switch clock time, whereas the name/code of each of the plurality of signal channels may be used as a post-switching signal.

The switch information sharing unit 131 is configured to hold the pieces of switch information provided thereto from the respective clients 21, 22 and 23 through the client ports 111, 112 and 113 and the delay adjusting units 101, 102 and 103. The switch information sharing unit 131 is configured to hold the port code of each client and pieces of switch information of each client in a list form (hereinafter referred to as a switch information list) in association with each other. Every time a signal is selected, the signal selection is configured to be added to the switch information list as a list element.

Further, the switch information sharing unit 131 is configured to provide a part or all of the switch information lists held therein to the respective client ports 111, 112 and 113 through the respective delay adjusting units 101, 102 and 103. It is herein unnecessary to provide each of the client ports 111, 112 and 113 with a piece of switch information of its relevant client, because each client does not need its own switch information. Each client port is herein provided with pieces of switch information of the other client for allowing its relevant client to display and output a signal selection state regarding a client preceding the relevant client in the logical connection order. For example, the client 23 is provided with pieces of switch information of the clients 21 and 22 for allowing the client 23 to display and output signal selection results of the client 21 and 22. Therefore, the switch information sharing unit 131 is configured to provide at least a piece of switch information of another client preceding each client in the logical connection order. Further, the switch information sharing unit 131 is configured to provide the selection signal determining unit 135 with the switch information lists created and held therein.

Each of the delay adjusting units 101, 102 and 103 is configured to execute a delay processing for the piece of switch information supplied thereto from the switch information sharing unit 131 by the same delay amount as the signal group based on the piece of delay control information provided thereto from the delay amount determining unit 130. Specific explanation will be provided below for the delay control processing for a piece of switch information.

The selection signal determining unit 135 is configured to determine a piece of server selection signal information based on the switch information lists supplied thereto from the switch information sharing unit 131 and provide the distribution delay adjusting unit 110 with the piece of server selection signal information. The distribution delay adjusting unit 110 is configured to select a signal from the signal group provided thereto from the signal input unit 100 and generate a server selection signal based on the piece of server selection signal information. Further, the distribution delay adjusting unit 110 is configured to delay the server selection signal based on the piece of delay control information provided thereto from the delay amount determining unit 130 and provide the distribution output unit 120 with the delayed server selection signal. Specifically, the name or code of a signal channel (e.g., the signal channel "ORIGINAL SIGNAL 1" or "ORIGINAL SIGNAL 2") is herein used as a piece of server selection signal information.

Further, the delay adjusting units 101, 102 and 103 are respectively connected to the clients 21, 22 and 23 through the client ports 111, 112 and 113. The delay amounts to be determined by the delay amount determining unit 130 are uniquely set for respective processing channels, i.e., the delay adjusting units 101, 102 and 103. The configuration is employed for emulating a logical connection order (sequential connection in the exemplary embodiment 1) among clients through the control of the delay amounts of the signal group to be supplied to the respective clients 21, 22 and 23, and thereby for allowing a plurality of workers to easily execute a checking task. Further, the delay amounts of the respective delay adjusting units 101, 102 and 103 are also different from the delay amount of the distribution delay adjusting unit 110. It should be noted that the exemplary embodiment 1 explains an example that three clients are connected (i.e., an example that the number of processing channels is three). However, the number of clients and the number of processing channels can be arbitrarily set. In this case, the distribution server 10 is required to be provided with processing channels, the number of which is greater than the number of clients to be connected.

For example, the distribution server 10 can be implemented by adding the functions explained in the exemplary embodiment 1 to an audio/video signal distribution device widely used in general. Such processing can be implemented by, for instance, a software program running on a general-purpose computer and hardware including an audio/video signal processing circuit, a microcomputer and a memory. Further, each of the clients 21, 22 and 23 can be specifically implemented by, for instance, adding means for providing a piece of switch information and a processing of selecting a signal to be displayed and outputted from a signal group based on the supplied piece of switch information to a switcher device for a video signal and/or an audio signal, which is widely used in general.

2. Processing Flow (2-1. Determination and Change of Logical Connection)

Figure 4:
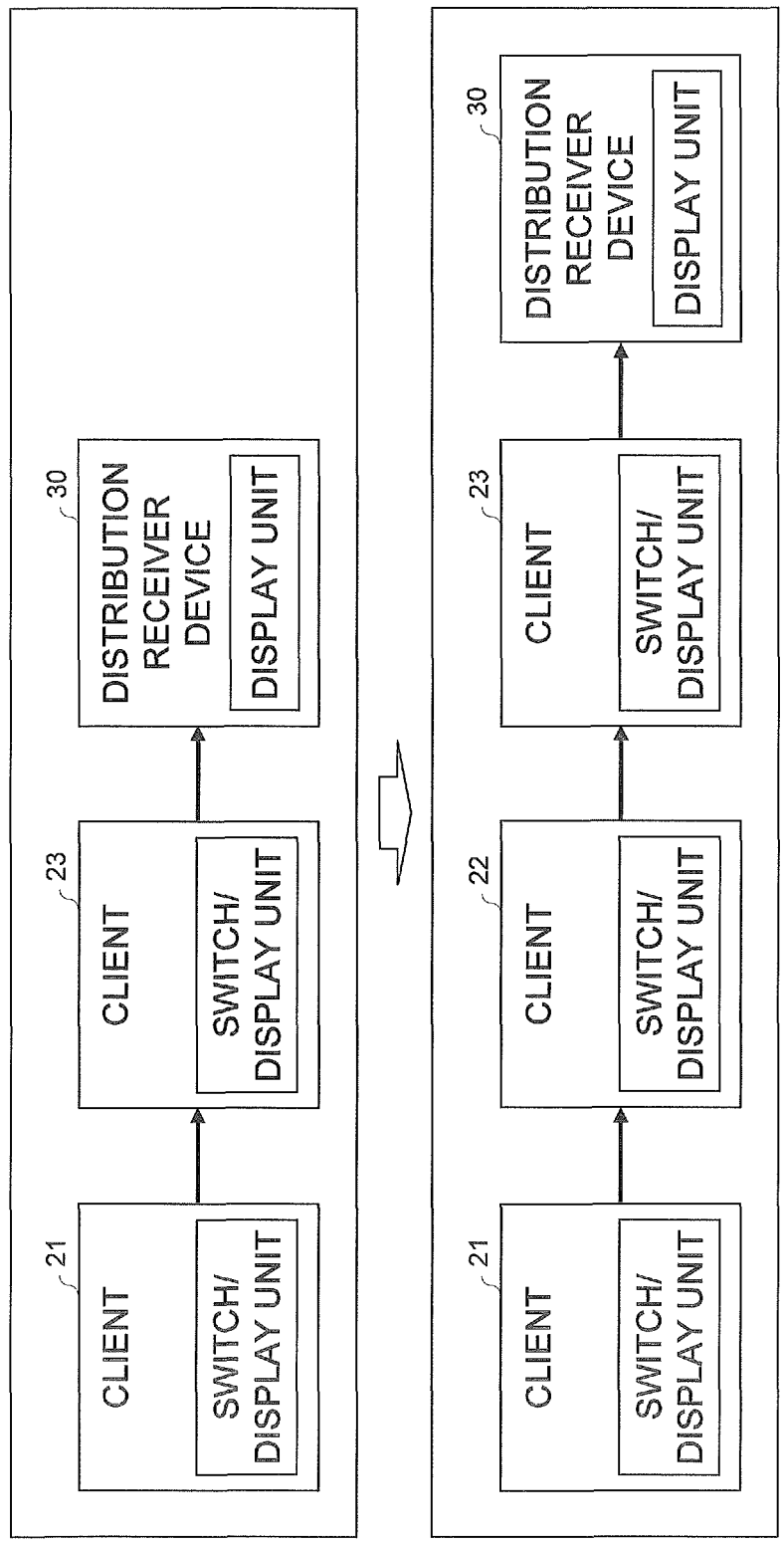
FIG. 4 is a diagram schematically showing an exemplary situation that a client is attached to a logical connection in the exemplary embodiment 1.

First, explanation will be provided for determination of a logical connection in the distribution system 1. For example, explanation will be provided for an exemplary case that another client is added to a logical connection between or among clients. FIG. 4 schematically shows a situation of a logical connection where another client (the client 22) is added to a state that a logical connection is established by the two clients 21 and 23. The upper part of FIG. 4 shows a logical connection of a pre-addition state, whereas the lower part of FIG. 4 shows a logical connection of a post-addition state. Further, the upper part of FIG. 4 corresponds to a state that the client 22 in FIGS. 1 and 2 is physically unconnected.

Firstly, the client 23 is herein physically connected to the distribution server 10 in a situation of the upper part of FIG. 4. For example, a transmission path is connected to the distribution server 10 in order to transfer a signal group and a piece of switch information. For example, in the case of a video signal and/or an audio signal, HD-SDI (High Definition Serial Digital Interface) is used for the connection. HD-SDI is standardized based on SMPTE (Society of Motion Picture and Television Engineers)-292M generally used for professional applications. In HD-SDI, a video signal and an audio signal are transmitted while the audio signal is multiplexed with the video signal. Such signal transmission is a technology widely used in general. Therefore, specific explanation thereof will not be hereinafter provided.

Next, specific explanation will be provided for a logical connection determining processing to be executed by the delay amount determining unit 130. Firstly, the following premise is set for determining a logical connection order in the exemplary embodiment 1. In short, the distribution receiver device 30 must be connected last without exception. The reason is that, in the exemplary embodiment 1, the respective clients 21, 22 and 23 are devices for executing a checking/modifying task, whereas the distribution receiver device 30 is a device for receiving a signal determined by the clients 21, 22 and 23 as a signal to be distributed therefrom (server selection signal). Without the aforementioned premise, the following processing may be executed for the distribution receiver device 30 similarly to the clients.

Figure 5:
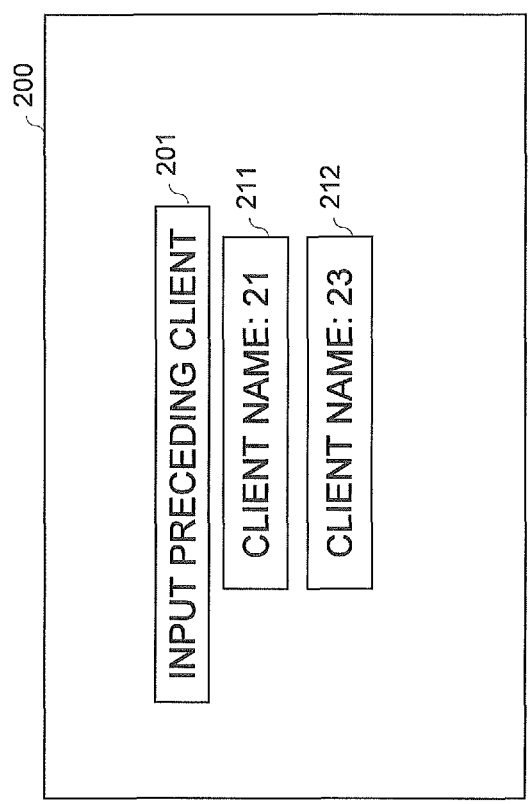
FIG. 5 is a diagram showing a specific configuration example of an input screen for a piece of logical connection information in the exemplary embodiment 1.

For example, the logical connection order is determined based on a piece of information to be inputted based on a user's setting (hereinafter referred to as logical connection information). FIG. 5 shows a specific example of an input screen configuration for inputting a piece of logical connection information (exemplary dependent information) for physically connecting a client anew to an existing logical connection.

A logical connection information input screen 200 is formed by an input inductive display area 201 and client selection display areas 211 and 212. The input inductive display area 201 is a display area for requesting a user to input a piece of logical connection information. The client selection display areas 211 and 212 are display areas set as options regarding a preceding client for determining a logical connection.

The term "preceding client" herein refers to a client desired to be referred by a user's own client. In other words, the term "preceding client" means a client desired to be arranged forwards of a user's own client in the logical connection order.

For example, when selecting the client selection display area 211 on the screen shown in FIG. 5, the client 22 is disposed between the client 21 and the client 23 as shown in FIG. 4.

It should be noted that the client selection display areas (areas 211 and 212 in the case of FIG. 5) are displayed in accordance with the clients that have been already connected to the distribution server 10. When another client is physically connected anew, the number of client selection display areas and client names displayed therein are arbitrarily changed. FIG. 4 shows an exemplary case that the client 22 is physically connected anew under the condition that the clients 21 and 23 have been already connected. As shown in FIG. 5, in this exemplary case, the client selection display area 211 displays "CLIENT NAME: 21" corresponding to the client 21, while the client selection display area 212 displays "CLIENT NAME: 23" corresponding to the client 23.

Next, a user inputs a piece of logical connection information with reference to the logical connection information input screen 200. Specifically, a user selects one from the client selection display areas 211 and 212 as a desired preceding client. The lower part of FIG. 4 shows a case that the client selection display area 211 (i.e., the client 21) is selected. In this case, the client (the client 22 in the example shown in FIG. 4), having inputted a piece of logical connection information, is set rearwards of the client selected as a preceding client in the logical connection order. For example, when selecting the client 21 as a preceding client, the client 22 is set rearwards of the client 21 in the logical connection order. Thus, the logical connection order is determined by pieces of logical connection information of all the physically connected clients. The delay amount determining unit 130 is provided with the pieces of logical connection information of the respective clients and determines the logical connection order.

It should be noted that, when selecting the client 21 as a preceding client in the example of FIG. 4 of the present exemplary embodiment 1, for instance, the clients 22 and 23 may be arbitrarily arranged in the logical connection order. In such case, the logical connection order is determined by, for instance, the codes of connection terminals to be physically connected or the codes of processing channels. Further, when a given client is physically connected to the distribution server 10 first, the given client is set to be first in the logical connection order even without input of a piece of logical connection information. Therefore, such client is not required to display the logical connection information input screen 200. Further, the exemplary embodiment 1 has explained the example that the number of clients is three. However, the number of clients may be other than three. Even in this case, the processing described above may be similarly executed, or alternatively, processing described below may be executed, while the number of target clients is changed.

(2-2. Switch Operation and Checking Task of Another Client Selection Signal in Each Client)

Figure 6:
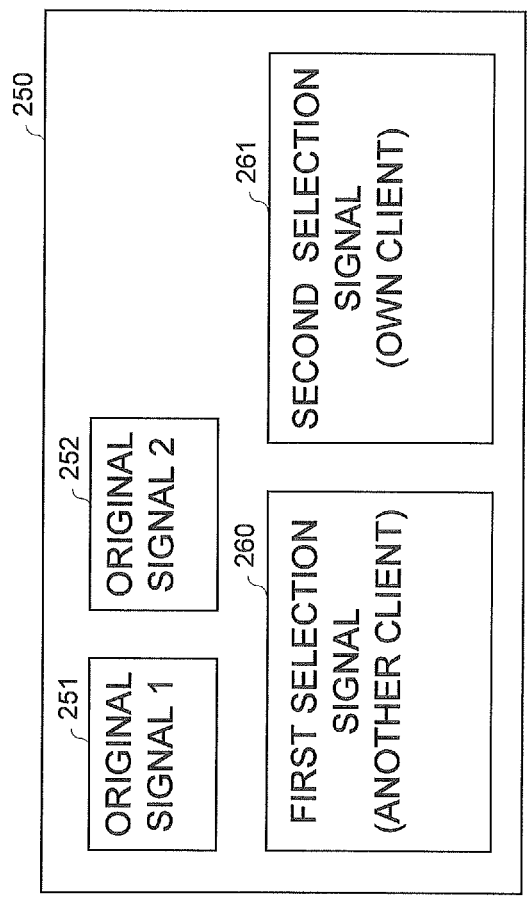
FIG. 6 is a diagram showing a specific configuration example of a screen of a client in the exemplary embodiment 1.

Prior to explanation of a switch operation, explanation will be firstly executed for display and output of signals to be presented to a user in each of the clients 21, 22 and 23. For example, a user executes a switch operation with reference to such displayed and outputted signals. FIG. 6 shows a specific example of a screen configuration regarding signal display in each of the clients 21 and 22 and 23. A display screen 250 is formed by original signal display areas 251 and 252, a first selection signal display area 260 and a second selection signal display area 261.

The original signal display areas 251 and 252 are areas for displaying respective signals included in the signal group to be provided to each client from a relevant one of the client ports 111, 112 and 113 in the distribution server 10. For example, each of the original display areas 251 and 252 is configured to display a video signal.

The first selection signal display area 260 is an area for displaying a video signal as a selection signal of another client. The second selection signal display area 261 is an area for displaying a signal that is selected from the signal group provided to a given client displaying the display screen 250 containing this area 261 based on a switch operation. The signal selected in each client is herein referred to as "a client selection signal". In other words, a client selection signal is a signal selected as a result of a switch operation in a user's own client.

Next, explanation will be provided for a processing flow of the distribution server 10 where each user executes a switch operation in his/her corresponding one of the clients 21, 22 and 23, together with explanation for the configuration of the display screen 250. Firstly, each user inputs a switch operation into his/her corresponding one of the clients 21, 22 and 23. For example, a switch operation is executed through buttons (not shown in the figures) for selecting signals in each of the clients 21, 22 and 23. Each of the clients 21, 22 and 23 is configured to select a predetermined signal channel from the signal group based on the switch operation input. Then, each of the clients 21, 22 and 23 is configured to display the selected signal (i.e., the client selection signal) on the second selection signal display area 261 of the display screen 250 thereof. For example, signal channels to be displayed in the original signal display areas 251 and 251 are herein respectively set as "ORIGINAL SIGNAL 1" and "ORIGINAL SIGNAL 2". When either of buttons for selecting "ORIGINAL SIGNAL 1" and "ORIGINAL SIGNAL 2" is pressed, a signal corresponding to the pressed button (i.e., "ORIGINAL SIGNAL 1" or "ORIGINAL SIGNAL 2") is inputted. Each of the clients 21, 22 and 23 is configured to display the selected signal (the client selection signal) in the second selection signal display area 261 of the display screen 250 thereof.

Next, explanation will be provided for a processing of allowing each user to check a client selection signal of another client in his/her corresponding one of the clients 21, 22 and 23, together with explanation for the configuration of the display screen 250. Each user checks a client selection signal of another client with reference to the first selection signal display area 260 in his/her corresponding one of the clients 21, 22 and 23. The first selection signal display area 260 is configured to display a signal selected based on the signal group provided from a corresponding one of the client ports 111, 112 and 113 in the distribution server 10 and a piece of switch information of another client.

Each of the clients 21, 22 and 23 is configured to select the same signal as a client selection signal selected by a preceding client (i.e., a client selection signal of another client) from the signal group based on the piece of switch information of another client, and display the selected signal in the first selection signal display area 260 of the display screen 250 thereof. For example, the client 22, for which the client 21 is set as a preceding client, is configured to display the same signal as the client selection signal displayed in the client 21 on the first selection signal display area 260 of the display screen 250 thereof based on the piece of switch information of the client 21.

To thus display the same signal as the client selection signal of another client in each of the clients 21, 22 and 23, delaying and clock time adjustment as executed for the signal group are similarly required for a piece of switch information of another client to be provided to each client. Through the delay processing (e.g., synchronization of a piece of signal information of another client and respective signals in the signal group), signal switching can be appropriately executed based on the piece of signal information of another client. Accordingly, each of the clients 21, 22 and 23 can appropriately display a client selection signal of another client. For example, through the synchronization of a piece of switch information of the client 21 and each signal in the signal group, the client 22 can appropriately execute signal switching based on the piece of switch information and can appropriately display the client selection signal of the client 21. Specific explanation will be provided below for the delay processing and the clock time adjusting processing for a piece of switch information and a signal group.

The exemplary case that a signal is a video signal has been explained above. However, the aforementioned processing can be also similarly executed for a case that a video signal and an audio signal are included in a single signal. In this case, for instance, each of the clients 21, 22 and 23 is configured to select a signal (a video signal) displayed in the first selection signal display area 260, and simultaneously, output an audio signal while the audio signal is switched similarly to the video signal. Alternatively, when an audio signal is only included in a single signal, each of the clients 21, 22 and 23 is configured to display an audio signal without displaying a video signal in the first selection signal display area 260 of the display screen 260. For example, an audio signal is displayed or outputted in a variety of forms including audio signal waveform display, level meter display and sound output.

In this case, similarly to a video signal, an audio signal is outputted while being switched. For example, output of an audio signal may be switched based on the selection by pressing of the aforementioned buttons for selecting signals (not shown in the figures). For example, an audio signal may be configured to be provided as a sound to a user through a speaker connected to each of the clients 21, 22 and 23.

Such selection and switching of a video signal and an audio signal can be executed as follows. For example, in the case of a video signal, selection and switching are executed on a frame (vertical synchronization) unit of a video signal. On the other hand, in the case of an audio signal, it is possible to employ, for instance, a method of executing selection and switching in response to a frame of a video signal or a method of executing selection and switching on a preliminarily determined duration unit. Such processing are technologies generally used for audio switcher devices and video switcher devices. Therefore, specific explanation thereof will not be hereinafter provided.

With the aforementioned processing, the present distribution system 1 allows a plurality of workers to check a signal using the respective clients 21, 22 and 23. Further, the present distribution system 1 allows a plurality of workers to share and execute a switch operation in the respective clients 21, 22 and 23. Thus, high quality signal distribution and editing can be executed in a short period of time by sharing such task as a switch operation by a plurality of workers. For example, as shown in FIG. 7, a signal editing task can be shared by three workers through the execution of the aforementioned logical connection.

Figure 7:
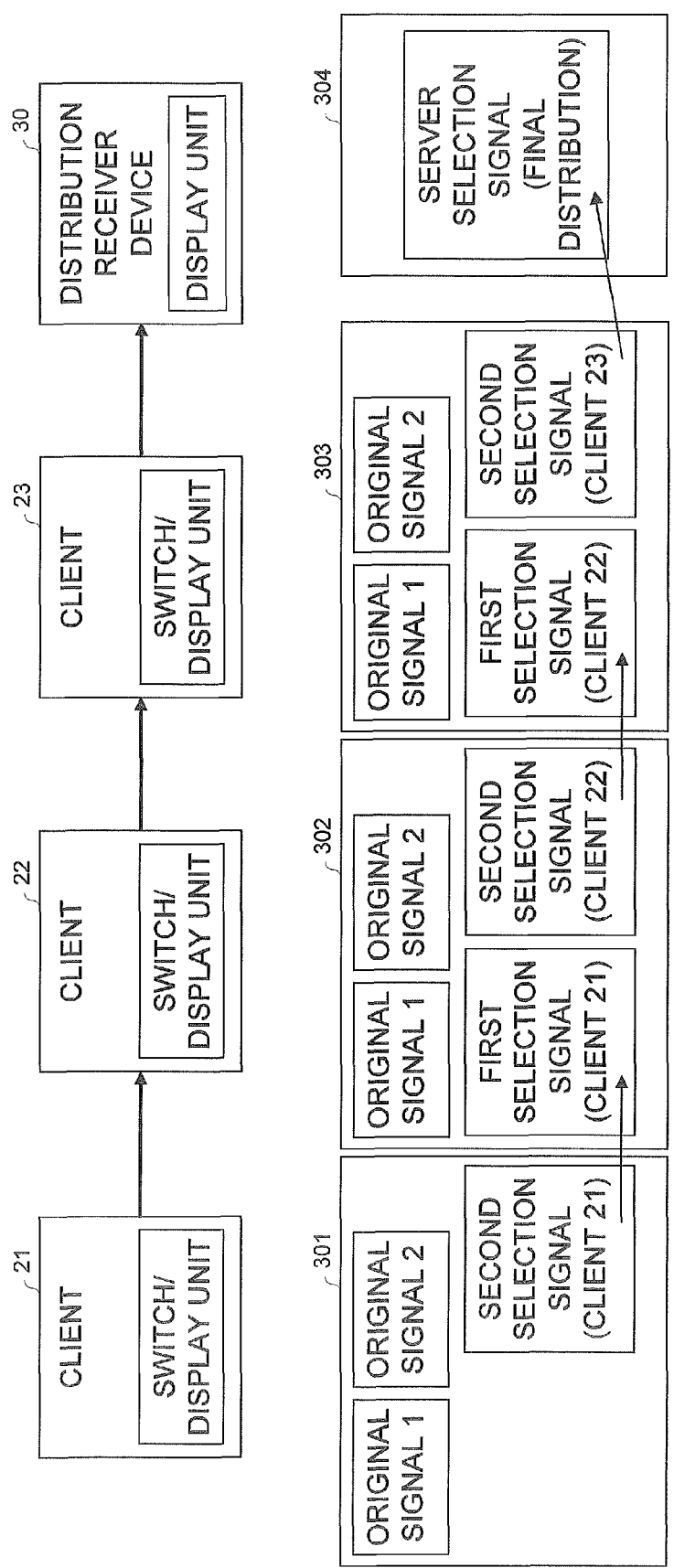
FIG. 7 is a diagram showing a relation between a connection state of clients and a screen configuration example in the exemplary embodiment 1.

FIG. 7 schematically shows a relation between a logical connection of the respective clients 21, 22 and 23 and display screens for displaying signals. The logical connection example in FIG. 7 corresponds to the example of FIG. 3. Display screens 301, 302 and 303 of clients respectively correspond to the display screens of the clients 21, 22 and 23. FIG. 7 shows an exemplary case that the clients 21, 22 and 23 are respectively operated by different workers. Further, a display screen 304 of the distribution receiver device corresponds to the display screen of the distribution receiver device 30.

For example, as shown in FIG. 7, the display screen 302 is configured to display a client selection signal of the client 21 set as a client immediately preceding the client 22 in the logical connection order in an area corresponding to the first selection signal display area 260 of FIG. 6. Accordingly, a selection result of the preceding client can be checked. Further, a plurality of workers can share and execute a switch operation by allowing each of the clients 21, 22 and 23 to select a client selection signal of another client displayed in the area corresponding to the first selection signal display area 260 of FIG. 6.

The same signal is herein displayed (and outputted) in the second selection signal display area 261 of the display screen 250 (a display area of a client selection signal of a user's own client) in a client immediately preceding a given client in the logical connection order and the first selection signal display area 260 (a display area of a client selection signal of another client) in the given client.

It should be noted that, in the exemplary embodiment 1, explanation has been provided for the processing of generating a client selection signal of another client in each of the clients 21, 22 and 23. However, the distribution server 10 may be configured to generate a client selection signal. In this case, each of the delay adjusting units 101, 102 and 103 is configured to select a desired signal from the signal group based on the piece of switch information provided thereto. Further, the signal herein selected is configured to be provided as a client selection signal to the first selection signal display area 260 of the display screen 250 in each of the clients 21, 22 and 23 through each of the client ports 111, 112 and 113.

3. Specific Processing of Respective Elements (3-1. Delay Amount Determination and Signal Delay Processing)

Specific explanation will be provided for the processing of determining the delay amount in the delay amount determining unit 130. As explained using FIGS. 4 and 5, for instance, the delay amount determining unit 130 is firstly configured to determine a logical connection order based on the pieces of logical connection information provided thereto. Subsequently, the delay amount determining unit 130 is configured to determine delay amounts of the respective delay adjusting units 101, 102 and 103 based on the determined logical connection order. The configuration can be implemented by sequentially increasing the delay amounts of the signal group to be provided to the respective clients from head to tail in the logical connection order. For example, when a logical connection order is set as shown in FIG. 3, the aforementioned configuration can be implemented by sequentially increasing the delay amounts of the signal group to be provided from the signal input unit 100 to the respective clients 21, 22 and 23 in the logical connection order. In other words, the delay amounts are set for establishing the relation "d1<d2<d3", where the delay amounts of the delay adjusting units 101, 102 and 103 are respectively expressed as "d1", "d2" and "d3".

Thus, through the determination of the delay amounts based on a logical connection order, for instance, an erroneous operation in switching by the client 21 can be modified by the clients 22 and 23. Further, the delay amount determining unit 130 is also configured to simultaneously determine the delay amount of the distribution delay adjusting unit 110. The delay amount is set to be a value greater than the maximum value of the delay amounts of the respective delay adjusting units 101, 102 and 103. For example, when a logical connection order is set as shown in FIG. 3, a delay amount of the distribution delay adjusting unit 110 is set for establishing the relation "d1<d2<d3<dt", where the delay amount of the distribution delay adjusting unit 110 is expressed as "dt". The delay amounts of the delay adjusting units 101, 102 and 103 and the distribution delay adjusting unit 110 are required to be different from each other for allowing the respective clients to execute a checking task, a modifying task for an erroneous operation in switching and etc. Specific explanation will be provided below for the processing of modifying an erroneous operation in switching.

Figure 8:
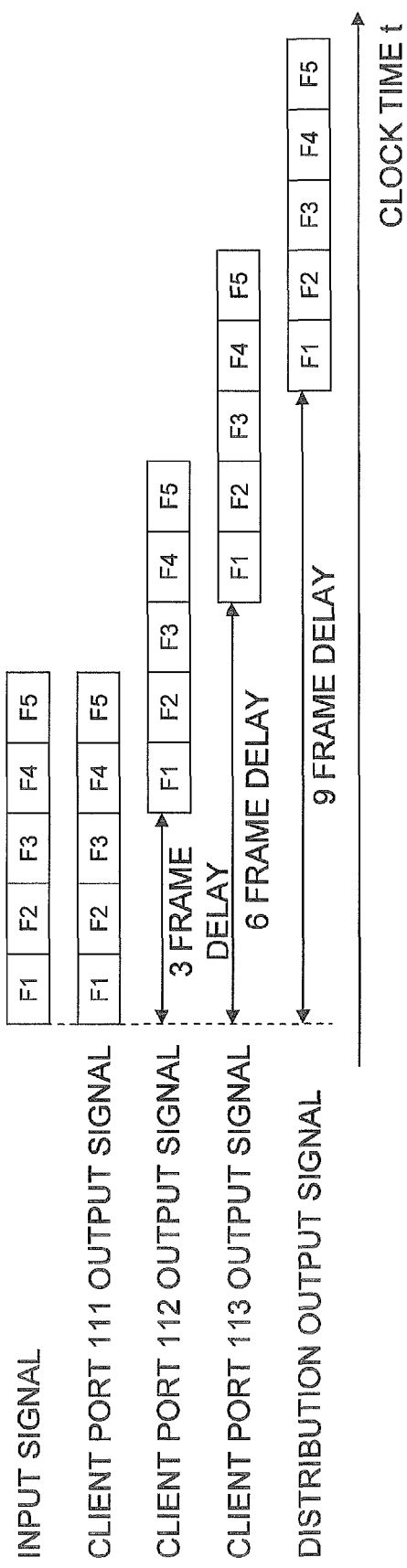
FIG. 8 is a diagram schematically showing a specific example of signal delayed states of respective clients in the distribution system 1.

Next, specific explanation will be provided for a signal delay processing to be executed by each of the delay adjusting units 101, 102 and 103 and the distribution delay adjusting unit 110 based on the delay amount determined by the delay amount determining unit 130. FIG. 8 schematically shows a specific example of delay states of the respective clients 21, 22 and 23 in the distribution system 1. FIG. 8 sequentially shows, from top to down, an input signal in the distribution server 10, a signal output state of a client port 111 output signal (i.e., an input in the client 21), a signal output state of a client port 112 output signal (i.e., an input in the client 22), a signal output state of a client port 113 output signal (i.e., an input in the client 23) and a signal output state of a distribution output signal to be outputted from the distribution server 10. The input signal represents a state of each signal in the signal group in the signal input unit 100. On the other hand, the client port 111 output signal, the client port 112 output signal, and the client port 113 output signal respectively represent delay states of respective signals in the signal group at respective points of time when each signal is outputted from the respective client ports 111, 112 and 113. Further, the distribution output signal represents a delay state of a server selection signal at a point of time when the server selection signal is outputted from the distribution output unit 120. The aforementioned delayed states are respectively produced by the delay adjusting units 101, 102 and 103 and the distribution delay adjusting unit 110.

FIG. 8 shows an exemplary case where the delay amounts "d1", "d2", "d3" and "dt" are respectively set to be 0, 3, 6 and 9 frames. The term "frame" herein refers to a processing unit for each signal. When a video signal is herein employed, for instance, a video signal is generally processed while being divided by, for instance, a unit of 1/30 or 1/25 seconds. When an audio signal is herein employed, on the other hand, an audio signal is processed while being preliminarily divided by a predetermined period (e.g., every 5 seconds or every frame of a video signal). Therefore, a delay processing is also executed by delaying a signal by a frame unit.

It should be noted that the time length of a frame may be set to be an arbitrary value. For example, a time duration from input to distribution can be shortened in inverse proportion to the time length of a frame. However, it is required to execute respective processing in a short period of time. The time length of a frame is set to be a value widely used in general for a relevant signal type (e.g., a video signal, an audio signal, etc.). A delay processing is executed by, for instance, converting a signal into a set of digital data by means of sampling. Then, the set of signal data is temporarily held in a memory. The read-out clock time of the set of signal data is then controlled based on the delay amount. Such signal delay processing is a technology widely used in general. Therefore, specific explanation thereof will not be hereinafter provided.

(3-2. Sharing of Switch Information)

Figure 9:
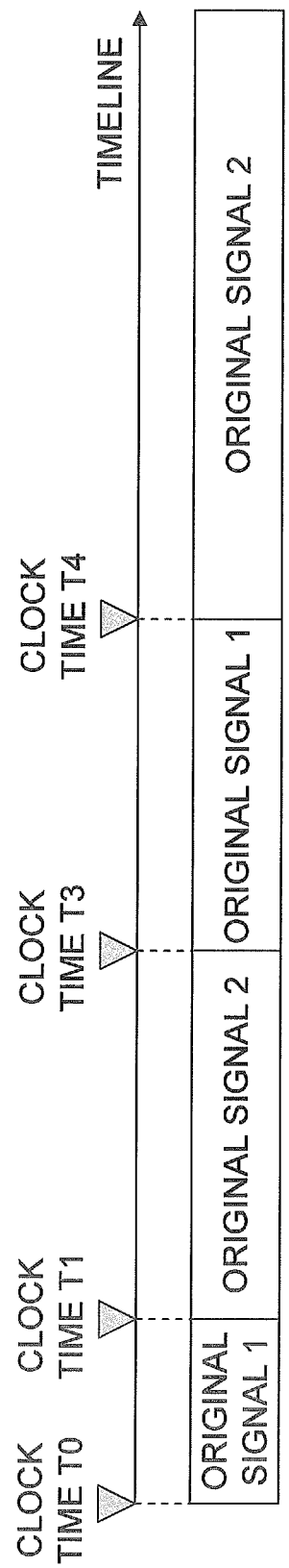
FIG. 9 is a diagram showing a specific example of a switch operation of a client in the exemplary embodiment 1.

Specific explanation will be provided for a processing of generating a switch information list in the switch information sharing unit 131. Firstly, a specific example will be provided for explaining a switch information list as a processing target. FIG. 9 shows a specific example of switch operations in a given client.

FIG. 9 shows an example that a signal channel in the client 21 is switched into the signal channel "ORIGINAL SIGNAL 1" at a clock time T0 and is then switched into the signal channel "ORIGINAL SIGNAL 2" at a clock time T1. Similarly, in the example of FIG. 9, the signal channel is switched into the signal channel "ORIGINAL SIGNAL 1" at a clock time T3 and is then switched into the signal channel "ORIGINAL SIGNAL 2" at a clock time T4. Such post-switching signal is set as a client selection signal in the client 21. Explanation will not be hereinafter provided for switching of signal channels in the other clients 22 and 23.

Thus, each of the clients 21, 22 and 23 is configured to determine a client selection signal thereof from the signals in the signal group provided thereto. FIG. 10 shows a specific example of a switch information list of a given client. Further, FIG. 10 corresponds to the specific example of switch operations in FIG. 9.

For example, as shown in FIG. 10, a switch information list is formed by items "CLIENT NAME", "POST-SWITCHING SIGNAL" and "SWITCH CLOCK TIME". The item "CLIENT NAME" is an item for setting a name of each client. FIG. 10 shows an example of a switch information list where the given client is the client 21. A sign, indicating the client 21 (e.g., "21"), is set as the item "CLIENT NAME".

The item "POST-SWITCHING SIGNAL" is a name for identifying a signal channel selected by a switch operation of each user operating his/her corresponding one of the clients 21, 22 and 23. For example, the item "POST-SWITCHING SIGNAL" is set to be either "ORIGINAL SIGNAL 1" or "ORIGINAL SIGNAL 2". Here, "ORIGINAL SIGNAL 1" and "ORIGINAL SIGNAL 2" are respective signal channels included in the signal group to be inputted into the signal input unit 100.

The item "SWITCH CLOCK TIME" represents a clock time when a signal channel is switched by a switch operation. For example, when the item "POST-SWITCHING SIGNAL" is changed into "ORIGINAL SIGNAL 1" at the clock time T0 as shown in FIG. 9, the item "SWITCH CLOCK TIME" is set to be the clock time T0 as shown in FIG. 10.

It should be noted that the exemplary embodiment 1 explains an example that two signal channels are included in a signal group. However, three or more signal channels may be included in a signal group. In this case, respective processing will be executed based on the number of signal channels included in a signal group.

Figure 11:
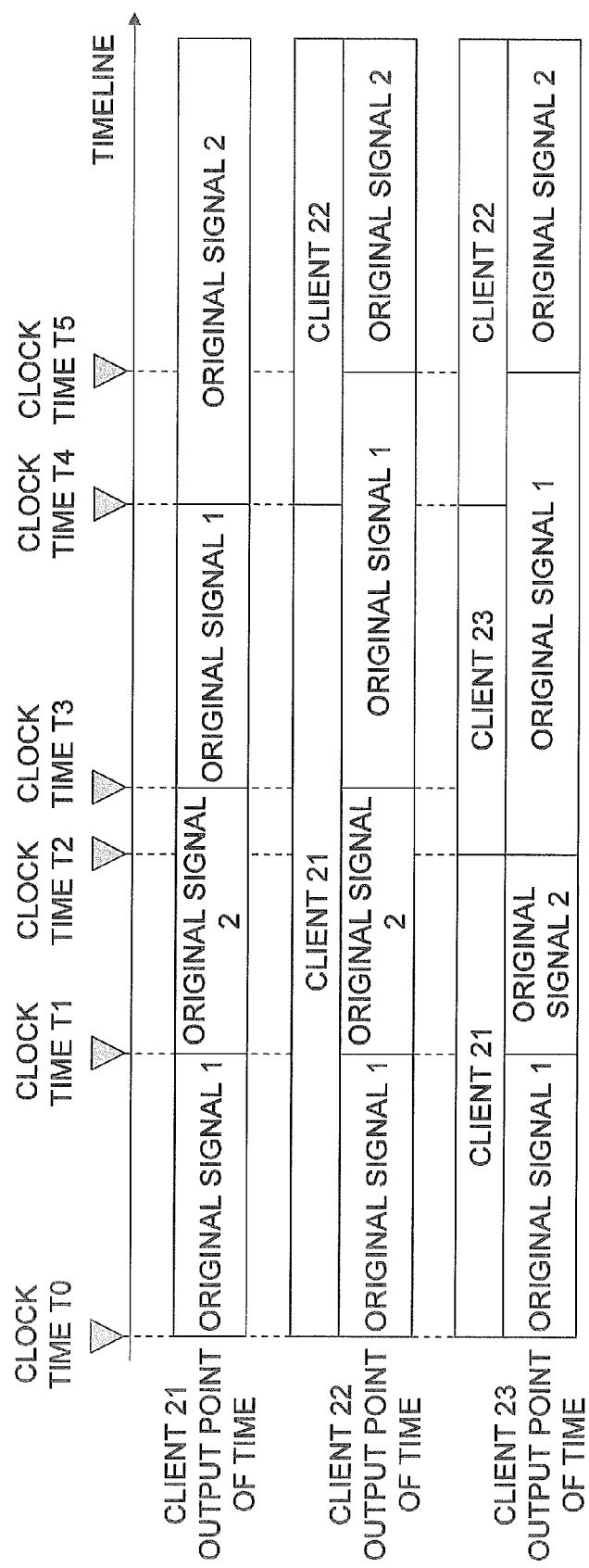
FIG. 11 is a diagram showing a specific example of all the switch operations in the exemplary embodiment 1.

FIG. 11 represents a specific example of switch operations in the entire distribution system (i.e., all the clients 21, 22 and 23) where a logical connection order is set as shown in FIG. 3. "CLIENT 21 OUTPUT POINT OF TIME" in FIG. 11 corresponds to an output example of a client selection signal in FIG. 9.

No client, preceding the client 21, exists in the logical connection order. Therefore, the client 21 selects either "ORIGINAL SIGNAL 1" or "ORIGINAL SIGNAL 2" as a signal channel. In an output example of client selection signals in FIG. 11, the upper line in each "CLIENT (21, 22, 23) OUTPUT POINT OF TIME" represents which one is selected from the preceding client and the user's own client at a given clock time. For example, in the case of "CLIENT 22 OUTPUT POINT OF TIME", either the client 21 (preceding client) or the client 22 (user's own client) is selected at a given clock time. Further, when the user's own client 22 is herein selected, this represents that the client 22 selects either "ORIGINAL SIGNAL 1" or "ORIGINAL SIGNAL 2" as a signal channel. On the other hand, the lower line in each "CLIENT (21, 22, 23) OUTPUT POINT OF TIME" represents a final client selection signal in each client. For example, in the case of "CLIENT 22 OUTPUT POINT OF TIME", the lower line represents signal channels respectively set as a client selection signal of the client 22. As a signal channel of the client 22, any one is selected from the options "ORIGINAL SIGNAL 1", "ORIGINAL SIGNAL 2" and "CLIENT 21".

In FIG. 11, the upper line of "CLIENT 23 OUTPUT POINT OF TIME" represents which one is selected from the preceding client and the user's own client 23. For example, in the case of "CLIENT 23 OUTPUT POINT OF TIME", any one is selected from the preceding clients 21 and 22 and the user's own client 23 at a given clock time. Further, the lower line of "CLIENT 23 OUTPUT POINT OF TIME" represents signal channels respectively set as a client selection signal of the client 23. As a signal channel of the client 23, any one is selected from the options "ORIGINAL SIGNAL 1", "ORIGINAL SIGNAL 2", "CLIENT 21" and "CLIENT 22".

FIG. 12 shows a specific example of a switch information list corresponding to all the switch operations in the distribution system 1. FIG. 12 corresponds to the example of switch operations in FIG. 11. Unlike FIG. 10, FIG. 12 shows an example of a switch information list regarding all the clients (the clients 21, 22 and 23) in the distribution system 1. In FIG. 12, the client names "21", "22" and "23" respectively correspond to the clients 21, 22 and 23.

Next, explanation will be provided for a processing of generating a switch information list. Firstly, explanation will be provided for a processing to be executed at the clock time T0 in the example of FIGS. 11 and 12. At the clock time T0, the clients with the client names "21", "22" and "23" respectively select "ORIGINAL SIGNAL 1", "CLIENT 21" (e.g., "ORIGINAL SIGNAL 1" as a signal channel selected by the client 21) and "CLIENT 21" (e.g., "ORIGINAL SIGNAL 1" as a signal channel selected by the client 21).

In the example of FIGS. 11 and 12, at the clock time T0, all the clients are respectively switched from a state that no original signal is inputted as a client selection signal to a state that an original signal is inputted as a client selection signal. For example, the clock time T0 corresponds to a clock time when the distribution server 10 is activated or a clock time when a user inputs a command of starting a switch operation task into an operation input unit (not shown in the figures) of the distribution server 10. It should be noted that the client selection signals in the respective clients 21, 22 and 23 are set to be predetermined values (initial values) at the clock time T0. Alternatively, initial values may be set by allowing a user to start inputting a switch operation.

Subsequently, each of the clients 21, 22 and 23 is configured to provide the switch information sharing unit 131 with a post-switching signal and its corresponding clock time (switch clock time) as a piece of switch information through a corresponding one of the client ports 111, 112 and 113 and a corresponding one of the delay adjusting units 101, 102 and 103. In this case, it is preferable to match respective clock times (e.g., the clock time T0) among the clients 21, 22 and 23. However, the clock time T0 can be adjusted even when varying among the clients 21, 22 and 23 due to difference in activation timing of them. For example, the clock time T0 can be adjusted among the clients 21, 22 and 23 by causing the switch information sharing unit 131 to hold pieces of switch information in a period from activation of the distribution server 10 to a given point of time.

In FIG. 12, for instance, the switch information sharing unit 131 holds only pieces of switch information respectively containing the item "SWITCH CLOCK TIME" valued as "CLOCK TIME T0" immediately after the clock time T0. The term "client selection signal information" herein refers to a piece of information required for generating a client selection signal in each of the clients 21, 22 and 23. For example, a piece of client selection signal information is a group of pieces of switch information (e.g., post-switching signals and switch clock times) in each of the clients 21, 22 and 23. The term "switch information" herein refers to a generic term of pieces of client selection signal information and pieces of information regarding other switch operations.

Next, explanation will be provided for a processing to be executed at the clock time T1 in the example of FIGS. 11 and 12. The client with the client name "21" selects a signal channel "ORIGINAL SIGNAL 2" at the clock time T1. This represents that a user, operating the client 21, selected the signal channel "ORIGINAL SIGNAL 2". Similarly to the processing to be executed at the clock time T0, the client 21 is configured to provide the switch information sharing unit 131 with a piece of client selection signal information at this time as a piece of switch information. On the other hand, as with the clock time T0, the switch information sharing unit 131 similarly holds pieces of switch information up to this point of time. In the example of FIG. 12, for instance, the switch information sharing unit 131 holds only pieces of switch information containing the item "SWITCH CLOCK TIME" valued as "CLOCK TIME T0" and that valued as "CLOCK TIME T1" immediately after the clock time T1.

Further, explanation will be provided for a processing to be executed at the clock time T4 in the example of FIGS. 11 and 12. The client with the client name "23" selects the signal channel "CLIENT 22" at the clock time T4. This represents that a user, operating the client 23, selected the client selection signal of the client 22 as the client selection signal of the client 23. Similarly to the processing to be executed at the clock time T0, at the clock time T4, the client 23 is configured to provide the switch information sharing unit 131 with "CLIENT 22" (as a value of the item "POST-SWITCHING SIGNAL") and "CLOCK TIME T4" (as value of the item "SWITCH CLOCK TIME") as a piece of switch information. On the other hand, as with the clock time T0, the switch information sharing unit 131 holds pieces of switch information up to this point of time. It should be noted that the respective elements are configured to similarly execute the aforementioned processing based on pieces of switch information generated in the respective clients 21, 22 and 23 at the other points of time except for the clock times T0, T1 and T4 in the example of FIGS. 11 and 12.

(3-3. Determination of Server Selection Signal Information and Generation of Server Selection Signal)

Specific explanation will be provided for a processing of determining a piece of server selection signal information in the selection signal determining unit 135. The selection signal determining unit 135 is configured to determine a piece of server selection signal information based on the switch information list and the logical connection order, which are provided thereto from the switch information sharing unit 131. For example, where the logical connection order is set as shown in FIG. 3, a piece of client selection signal information of the client 23 is set as a piece of server selection signal information. In the exemplary embodiment 1, the client 23 is thus characterized as a client for executing final check before distribution. Specifically, the selection signal determining unit 135 is configured to extract a group of pieces of switch information of the client 23 (with the client name "23") from the switch information list. Further, the selection signal determining unit 135 is configured to generate a piece of server selection signal information based on the extracted group of pieces of switch information and other pieces of switch information to be referred by the extracted group of pieces of switch information. The distribution delay adjusting unit 110 is provided with the piece of server selection signal information. Based on the piece of server selection signal information, the distribution delay adjusting unit 110 is configured to output, for instance, a signal corresponding to the signal channel "ORIGINAL SIGNAL 1" in the signal group as a server selection signal from the distribution server 10 through the distribution output unit 120.

Next, specific explanation will be provided for a processing of generating a piece of server selection signal information. For example, in the example of FIG. 12, the client 23 selects the signal paths "CLIENT 21", "ORIGINAL SIGNAL 1" and "CLIENT 22" as client selection signals at the clock time T0, the clock time T2 and the clock time T4, respectively. As to the signal path "ORIGINAL SIGNAL 1" selected as a client selection signal, a piece of switch information corresponding to this (i.e., the signal path "ORIGINAL SIGNAL 1" as a value of the item "POST-SWITCHING SIGNAL" and "CLOCK TIME T2" as a value of the item "SWITCH CLOCK TIME") is added to a piece of server selection signal information.

On the other hand, when the signal paths "CLIENT 21" and "CLIENT 22" are selected as client selection signals, it is required to further generate pieces of client selection signal information for the respective clients 21 and 22. The piece of client selection signal information of another client (i.e., the client 21, 22) is generated by extracting a piece of switch information of another client from the switch information list and by similarly executing the processing executed for the client 23.

When a client selection signal of another client is further selected with respect to the extracted piece of switch information, a piece of server selection signal information is generated by executing a processing of generating a piece of client selection signal information of another client in a recursive manner.

For example, when the client 23 selects the signal path "CLIENT 21" as a client selection signal at the clock time T0, the selection signal determining unit 135 extracts a piece of switch information of the client 21 (with the client name "21") from the switch information list. Further, the selection signal determining unit 135 generates a piece of client selection signal information based on the extracted piece of switch information and a piece of switch information to be referred by the extracted piece of switch information.

The processing of generating a piece of client selection signal information is executed for an duration (from the clock time T0 to the clock time T2 in the example of FIG. 12) in which the signal path "CLIENT 21" is selected as a client selection signal of the client 23. A piece of server selection signal information is generated whereby the signal paths "ORIGINAL SIGNAL 1" and "ORIGINAL SIGNAL 2" are respectively selected at the clock time T0 and the clock time T1 in the duration (from the clock time T0 to the clock time T2) in which the signal path "CLIENT 21" is selected.

FIG. 13 shows a specific example of a piece of server selection signal information to be generated from the example of FIG. 12. The piece of server selection signal information shown in FIG. 13 reflects results of generating pieces of client selection signal information of the clients 21 and 22 with respect to pieces of switch information of the client 23 (the client name "23") shown in FIG. 12.

On the other hand, the distribution delay adjusting unit 110 is configured to generate a server selection signal based on the piece of server selection signal information. The distribution delay adjusting unit 110 is configured to delay respective signals in the signal group to be provided thereto. Accordingly, the distribution delay adjusting unit 110 absorbs a processing time of executing a sending/receiving processing for pieces of switch information between the respective clients 21, 22 and 23 and the distribution server 10.

To generate a server selection signal, a delay processing is executed for a piece of server selection signal information based on the delay amount of the signal group. Specific explanation will be provided using FIG. 8 for the processing of delaying a piece of server selection signal information in the distribution delay adjusting unit 110. In FIG. 8, for example, where the head of a frame "F1" of "CLIENT PORT 111 OUTPUT SIGNAL" is set as a clock time Ta0, the frame "F1" of "DISTRIBUTION OUTPUT SIGNAL" is configured to be outputted nine frames later than the clock time Ta0. The distribution delay adjusting unit 110 is configured to execute signal path switching at a clock time obtained by adding the delay amount of each signal in the signal group to a clock time in each piece of switch information as a piece of server selection signal information.

A server selection signal is generated through the signal path switching based on the piece of server selection signal information for which a delay processing is executed. For example, in the example of FIG. 8, the distribution delay adjusting unit 110 is configured to execute signal path switching into the signal path set as a post-switch signal in each piece of switch information at the clock time delayed from the clock time Ta0 by nine frames.

(3-4. Delay Processing of Client Selection Signal Information)

Specific explanation will be provided for a delay processing for a piece of client selection signal information in the respective delay adjusting units 101, 102 and 103. The delay processing for a piece of client selection signal information in the delay adjusting units 101, 102 and 103 is required for displaying a client selection signal of another client preceding a given client.

In the exemplary embodiment 1, two delay processing methods will be explained as methods of implementing the delay processing. The first delay processing method relates to a method that a piece of client selection signal information is provided in synchronization with the signal group to be provided to each of the clients 21, 22 and 23. The second delay processing method relates to a method that a switch clock time in each of the clients 21, 22 and 23 is provided as a piece of client selection signal information before signal path switching is executed.

In the first delay processing method, a piece of client selection signal information is provided in synchronization with the signal group to be provided to each of the clients 21, 22 and 23. In this method, when being provided with the piece of client selection signal information, each of the clients 21, 22 and 23 is configured to select a signal path corresponding to each post-switching signal contained in a piece of client selection signal information and display and output the client selection signal. Each of the delay adjusting units 101, 102 and 103 is configured to delay respective signals in the signal group, and simultaneously, delay switch clock times in the respective pieces of switch information contained in the piece of client selection signal information by the same delay amount as that of the signal group. Each of the clients 21, 22 and 23 is provided with the result through the corresponding one of the client ports 111, 112 and 113.

For example, when the head of the frame "F1" in "CLIENT PORT 111 OUTPUT SIGNAL" shown in FIG. 8 is set as the clock time Ta0 and the client 21 executes a switch operation at the clock time Ta0, a switch clock time (as a piece of switch information) of the client 21 is set as the clock time Ta0 and the delay adjusting units 102 provides the client 22 with a piece of switch information as a piece of client selection signal information at the clock time obtained by adding the delay amount (d2=3 frames) to the clock time Ta0.

It should be noted that, in synchronization with the signal, a piece of switch information (as a piece of client selection signal information) is transmitted while being multiplexed with a video signal in the form of additional information by means of, for instance, HD-SDI. Packets, containing identifiers on a video frame basis, can be transmitted by means of HD-SDI. A piece of switch information can be thereby transmitted as described above, while being contained in a given packet. With the method, each of the clients 21, 22 and 23 can divide the given packet using a specific identifier and interpret the piece of switch information. Then, the client selection signal can be displayed and outputted based on the piece of switch information.

The second delay processing method is a method of providing a switch clock time in each of the clients 21, 22 and 23 as a piece of client selection signal information prior to the clock time when signal switching is required in each of the clients 21, 22 and 23. The piece of client selection signal information to be provided to each of the clients 21, 22 and 23 is produced by executing clock time adjustment for the piece of client selection signal information held in the switch information sharing unit 131. Through the clock time adjustment, each of the clients 21, 22 and 23 can determine a clock time for signal switching based on the piece of client selection signal information provided thereto. In other words, at (or immediately after) the clock time, each of the clients 21, 22 and 23 is configured to select a signal path corresponding to a post-switching signal contained in the piece of client selection signal information provided thereto, and display and output the selected signal path as the client selection signal thereof. Each of the delay adjusting units 101, 102 and 103 is configured to delay respective signals in the signal group and provide a switch clock time as a piece of client selection signal information, which is obtained by adding a time length (corresponding to the delay amount of the signal group) to a switch clock time in each piece of switch information as a piece of client selection signal information, to the corresponding one of the clients 21, 22 and 23 through the respective client ports 111, 112 and 113. For example, when the head of the frame "F1" of "CLIENT PORT 111 OUTPUT SIGNAL" shown in FIG. 8 is set as the clock time Ta0 and the client 21 executes a switch operation while a signal corresponding to the clock time Ta0 is displayed, a switch clock time (as a piece of switch information) to be held in the switch information sharing unit 131 is set as the clock time Ta0 and the delay adjusting unit 102 provides the client 22 with a piece of client selection signal information containing a clock time (switch clock time; e.g., clock time Tb0) obtained by adding the delay amount (d2=3 frames) to the clock time Ta0.

Figure 14:
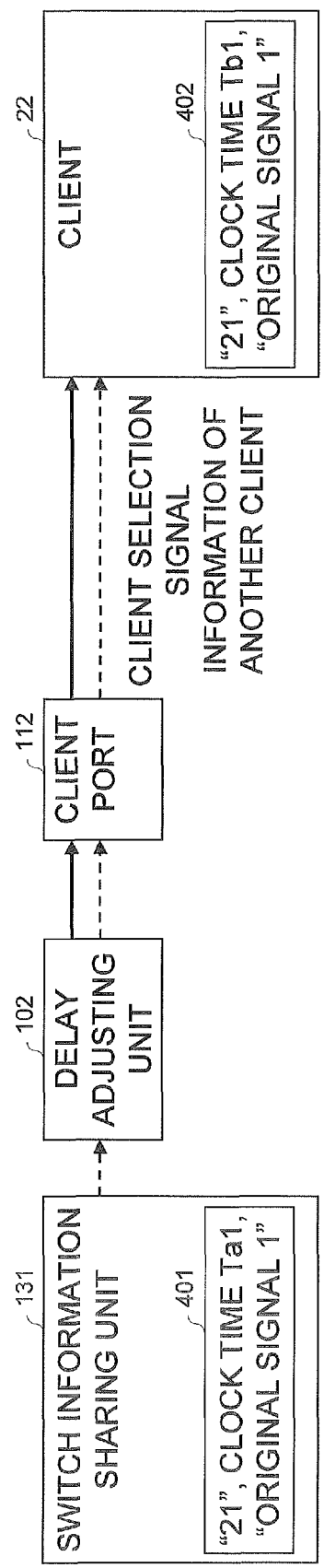
FIG. 14 is a diagram showing a relation between the distribution server and a client regarding a piece of switch information in the distribution system 1.

Explanation will be hereinafter provided for a relation between pieces of switch information and client selection signal information held in the switch information sharing unit 131 and a piece of client selection signal information to be provided to each of the clients 21, 22 and 23 in the example of the second delay processing method. FIG. 14 shows a specific example representing a relation between a piece of the client selection signal information to be provided from the distribution server 10 to the client 22 and pieces of switch information and client selection signal information held by the switch information sharing unit 131 in the distribution server 10. In FIG. 14, respective processing of and a connection among the switch information sharing unit 131, the delay adjusting unit 102 and the client port 112 are set as described above.

In FIG. 14, a piece of switch information 401 ("21", CLOCK TIME Ta1, "ORIGINAL SIGNAL 1") represents a client name, a switch clock time and a post-switching signal from head to tail in order. This is a part of plural pieces of information managed in the form of switch information lists by the switch information sharing unit 131.

Apiece of client selection signal information 402 ("21", CLOCK TIME Tb1, "ORIGINAL SIGNAL 1") in client 22 is a piece of client selection signal information regarding another client, and represents a client name, a switch clock time and a post-switching signal from head to tail in order. This represents a piece of client selection signal information to be generated based on the piece of the switch information 401 in the delay processing. As shown in FIG. 14, the piece of client selection signal information 402 is obtained by changing only the switch clock time of the piece of the switch information 401 in the second delay processing method. The clock time Tb1 is herein set as a clock time obtained by adding a time length corresponding to the delay amount (d2=3 frames, in the example of FIG. 8) to the clock time Ta1.

Figure 15:
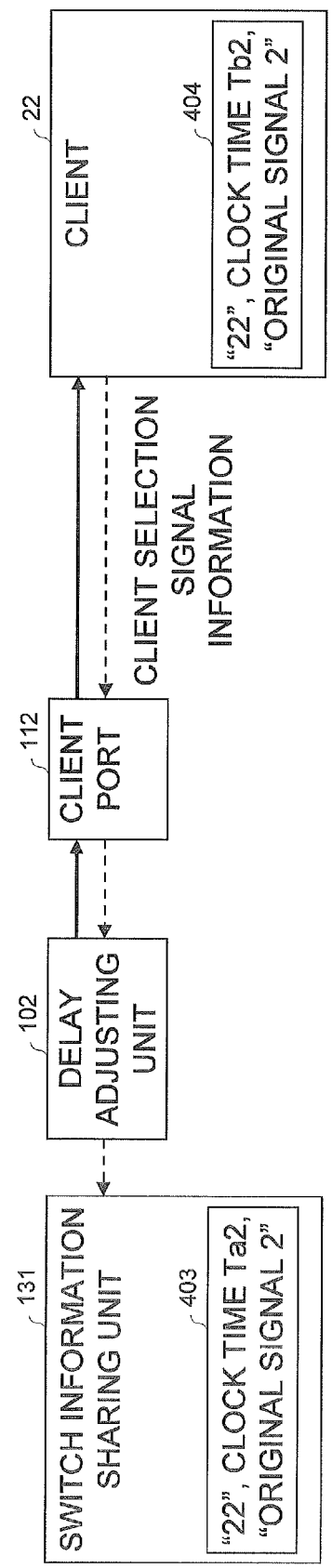
FIG. 15 is a diagram showing a relation between the distribution server and a client regarding a piece of switch information in the distribution system 1.

FIG. 15 shows a specific example of a relation between a piece of client selection signal information to be provided from the client 22 to the distribution server 10 and pieces of switch information and client selection signal information held by the switch information sharing unit 131 in the distribution server 10. FIG. 15 shows an example that information flow is directed oppositely to that in FIG. 14.

In FIG. 15, a piece of client selection signal information 404 ("22", CLOCK TIME Tb2, "ORIGINAL SIGNAL 2") in the client 22 is a piece of client selection signal information regarding a user's own client (i.e., the client 22), and represents a client name, a switch clock time and a post-switching signal from head to tail in order. This is a part of pieces of client selection signal information in the client 22. In FIG. 15, a piece of switch information 403 ("22", CLOCK TIME Ta2, "ORIGINAL SIGNAL 2" represents a client name, a switch clock time and a post-switching signal from head to tail in order. This represents a piece of switch information to be generated based on the piece of client selection signal information (i.e., the client selection signal information 404) to be provided thereto from the client 22.

Further, the piece of switch information 403 is managed together with the other pieces of switch information in the form of a switch information list in the switch information sharing unit 131. As shown in FIG. 15, the piece of switch information 403 is obtained by changing only the switch clock time of the piece of client selection signal information 402 in the second delay processing method. The clock time Ta2 is herein set as a clock time obtained by subtracting the delay amount (d2=3 frames, in the example of FIG. 8,) from the clock time Tb2. The subtraction processing is a processing of converting the delay amount of the signal group to be provided from each of the clients 21, 22 and 23 into a clock time to be processed in the distribution server 10 (i.e., the switch information sharing unit 131).

It should be noted that the clock time to be processed in the distribution server 10 (i.e., the switch information sharing unit 131) is set based on the signal group to be inputted into the signal input unit 100 as well as the first and second delay processing methods.

4. Modification of Erroneous Operation in Switching

Figure 16:
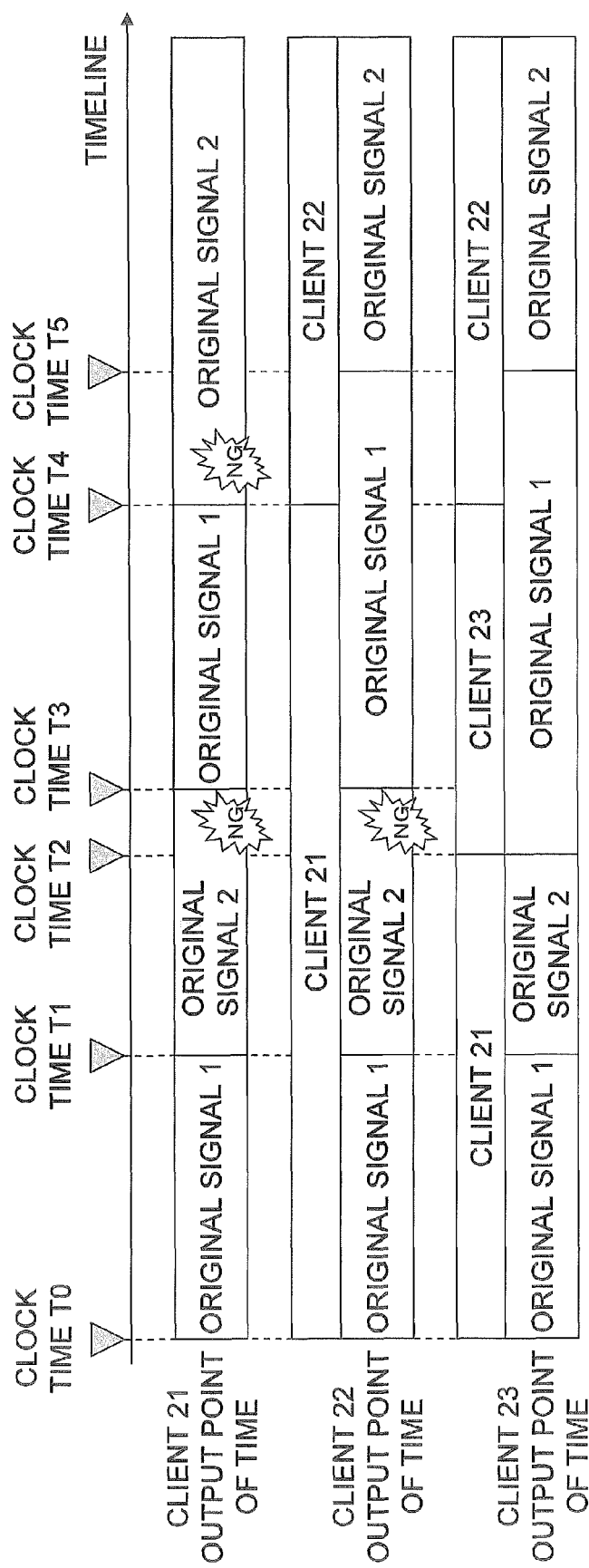
FIG. 16 is a diagram schematically showing a situation that an erroneous operation in switching is modified in the distribution system 1.

Specific explanation will be provided for a method of modifying an erroneous operation in switching by means of the distribution system 1 when an inappropriate signal path is selected against user's intension, for instance, due to the erroneous operation in switching in each of the clients 21, 22 and 23. The term "modification" herein refers to countermeasure for preventing an inappropriate signal from being outputted as a server selection signal. Examples of modification include cancellation of signal path switching and execution of signal path switching. FIG. 16 is a diagram schematically showing a situation of modifying an erroneous operation in switching in the distribution system 1.

FIG. 16 corresponds to the example of a switch operation in FIG. 11. FIG. 16 shows a situation of modifying an erroneous operation in switching in the client 21 in addition to the content of FIG. 11. In FIG. 16, "NG" represents that an inappropriate signal path was selected against user's intension due to an erroneous operation in switching. For example, FIG. 16 shows an exemplary case that an inappropriate signal path was selected against user's intension in the client 21. Further, in FIG. 16, modification is executed for inappropriate signal path selection ("NG") in a period between the clock time T4 and the clock time T5 in the client 22 (the modification will be hereinafter referred to as "first modification"), whereas modification is executed for inappropriate signal path selection ("NG") in a period between the clock time T2 and the clock time T3 in the client 23 (the modification will be hereinafter referred to as "second modification").

In the first modification, modification is executed for the inappropriate signal path selection in a period between the clock time T4 and the clock time T5 by causing the client 22 to extend display and output of the signal path "ORIGINAL SIGNAL 1" in a user's own client (i.e., the client 22). Specifically, when the client selection signal of the client 21 is inappropriate ("NG"), the on-going signal path is switched into the signal path "ORIGINAL SIGNAL 1" in response to an input into the client 22 at the clock time T4.

In the second modification, modification is executed for the inappropriate signal path selection in a period between the clock time T2 and the clock time T3 by causing the client 23 to advance display and output of the signal path "ORIGINAL SIGNAL 1" in a user's own client (i.e., the client 23). Specifically, when the client selection signal of the client 21 is inappropriate ("NG"), the on-gong signal path is switched into the signal path "ORIGINAL SIGNAL 1" in response to an input into the client 23 at the clock time T2.

Thus, in the distribution system 1 and the distribution server 10 of the exemplary embodiment 1, a client selection signal of another client preceding a given client (i.e., each of the clients 21, 22 and 23) can be checked in the given client. Further, an inappropriate signal can be prevented from being displayed and outputted (distributed) by modifying an erroneous operation in switching with respect to inappropriate signal path selection or an inappropriate signal.

Exemplary Embodiment 2

1. Configuration of Distribution System

In the exemplary embodiment 2, another practical example of the present invention will be explained. In the exemplary embodiment 2, a practical example will be explained for a case that a switch operation is shared and executed by a plurality of workers. The configuration of the distribution system in the exemplary embodiment 2 is the same as that of the distribution system 1 in the exemplary embodiment 1. Therefore, processing in respective elements will be executed similarly to the exemplary embodiment 1, except for some processing peculiar to the exemplary embodiment 2. Further, the exemplary embodiment 2 will be explained using the reference signs and etc. used in the exemplary embodiment 1.

The exemplary embodiment 1 and the exemplary embodiment 2 are different from each other regarding a processing of determining a logical connection order, a processing of determining the delay amount based on the logical connection order, a display processing in each client, a processing of determining a piece of server selection signal information and a switch operation sharing method to be implemented by the combination of the aforementioned processing. These differences will be hereinafter specifically explained.

2. Processing Flow (2-1. Input of Logical Connection Information and Determination of Logical Connection)

Figure 17:
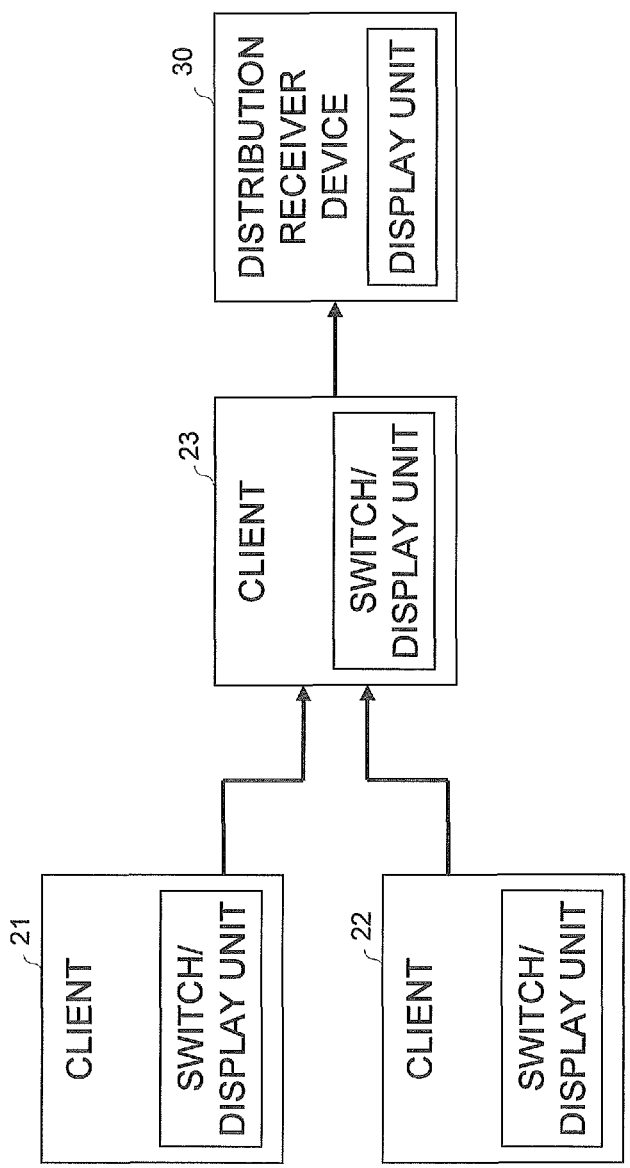
FIG. 17 is a diagram schematically showing a logical connection state of clients in an exemplary embodiment 2.

FIG. 17 is a diagram schematically showing an example of a logical connection state of the respective clients 21, 22 and 23 in the exemplary embodiment 2. The logical connection in the exemplary embodiment 2 is different from that in the exemplary embodiment 1 (e.g., FIG. 3) in that the clients 21 and 22 are aligned in parallel to each other. In the exemplary embodiment 2, the configuration is produced for allowing a plurality of workers to share and execute a switch operation. When a task is simultaneously executed by a plurality of workers, frequency of delay is reduced, and accordingly, delay of a signal group can be shortened in the entire system.

The exemplary embodiment 2 is different from the exemplary embodiment 1 regarding the processing of inputting a piece of logical connection information (selection of a preceding client) and the processing of determining a logical connection. Firstly, explanation will be provided for the processing of inputting a piece of logical connection information. FIG. 17 shows the same situation as that of the logical connection in the exemplary embodiment 1, where no client preceding the clients 21 and 22 exists while the client 23 selects the clients 22 and 23 as preceding clients thereof.

The clients 21 and 22 are herein set as clients for allowing a plurality of workers to share and input a switch operation. On the other hand, the client 23 is assumed to be used as a client for executing final check and also for allowing a person in charge of distribution or the like to execute a checking/modifying task. Therefore, unlike the exemplary embodiment 1, the client for executing final check is configured to be able to select a plurality of clients as preceding clients thereof. Further, in the exemplary embodiment 1, the logical connection is determined to be in a sequential order without exception. Compared to this, in the exemplary embodiment 2, the logical connection can be set in parallel as shown in FIG. 17. In this case, the same value is set for the delay amounts of the respective delay adjusting units (the delay adjusting units 101 and 102 in the example of FIG. 17) in parallel-connected clients (the clients 21 and 22 in the example of FIG. 17).

(2-2. Sharing of Switch Operation)

Using FIG. 17, explanation will be provided for sharing of a switch operation, a checking task and a modifying task among the clients 21, 22 and 23. In the exemplary embodiment 2, the respective clients 21, 22 and 23 are categorized into clients for selecting a signal path (hereinafter referred to as check-target clients) and a client for checking a plurality of client selection signals selected by the respective check-target clients (hereinafter referred to as a check-execution client). The categorization is determined based on the logical connection of the clients.

For example, in the case of FIG. 17, the clients 21 and 22 are categorized as the check-target clients, whereas the client 23 is categorized as a check-execution client.

Each check-target client is a client for executing a switch operation task, and may be configured to be in charge of one or more of a plurality of signal channels as switch operation objects. For example, when five signals are handled as a signal group, the client 21 may be configured to execute a switch operation for two signals, whereas the client 22 may be configured to execute a switch operation for the remaining three signals. In this case, the check-execution client (the client 23 in the example of FIG. 17) is configured to select one from the client selection signals of the respective check-target clients (the clients 21 and 22 in the example of FIG. 17) generated by the shared switch operation. Further, the check-target clients may be configured to process all the signal paths as targets, whereas the check-execution client may be configured to check and select the client selection signals of the respective check-target clients. In this case, using the distribution system 1 of the exemplary embodiment 2, signal distribution can be executed by, for instance, allowing a plurality of workers to share a switch operation and a checking task.

(2-3. Configuration of Client Display Screen)

Figure 18:
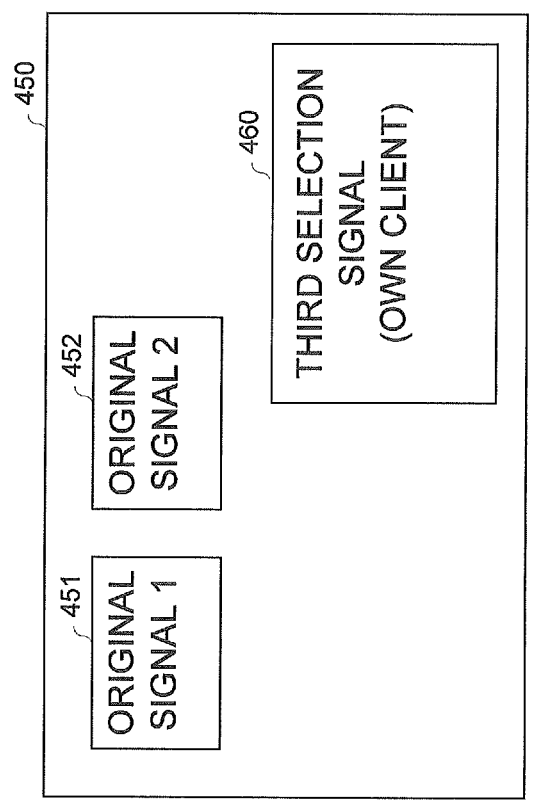
FIG. 18 is a diagram showing a specific example of a screen configuration of a check-target client in the exemplary embodiment 2.

The logical connection order of the exemplary embodiment 2 is different from that of the exemplary embodiment 1. Therefore, the display screen configurations in the respective clients 21, 22 and 23 of the exemplary embodiment 2 are different from those of the exemplary embodiment 2. FIG. 18 shows a specific configuration example of a display screen of signals in each check-target client of the exemplary embodiment 2. A display screen 450 is formed by original signal display areas 451 and 452 and a third selection signal display area 460.

The original signal display areas 451 and 452 are areas for displaying respective signals in the signal group to be provided to each check-target client from a corresponding one of the client ports (the client ports 111 and 112 in the example of FIG. 17) as the distribution server 10. For example, each check-target client is configured to display respective video signals provided thereto as a signal group on the respective original signal display areas 451 and 452. The third selection signal display area 460 is an area for displaying a client selection signal of each check-target client.

Figure 19:
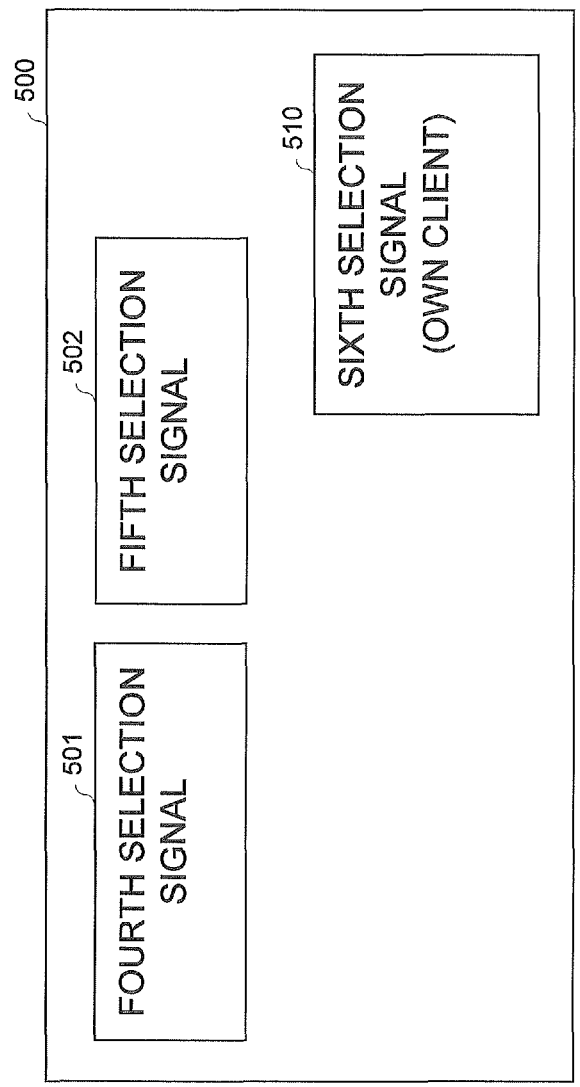
FIG. 19 is a diagram showing a specific example of a screen configuration of a check-execution client in the exemplary embodiment 2.

FIG. 19 shows a specific configuration example of a display screen of signals in the check-execution client (the client 23 in the example of FIG. 17). A display screen 500 is formed by a fourth selection signal display area 501, a fifth selection signal display area 502 and a sixth selection signal display area 510. The fourth and fifth selection signal display areas 501 and 502 are areas for displaying respective signals in the signal group to be provided to the check-execution client from a corresponding client port (the client port 113 in the example of FIG. 17) as the distribution server 10. For example, the check-execution client is configured to display respective video signals to be provided thereto as a signal group in the fourth and fifth selection signal display areas 501 and 502. In the example of FIG. 17, the client selection signal in the client 21 is configured to be displayed in the fourth selection signal display area 501. On the other hand, the client selection signal in the client 22 is configured to be displayed in the fifth selection signal display area 502.

The sixth selection signal display area 510 is an area for displaying a client selection signal of the check-execution client. In the example of FIG. 17, a signal to be displayed in the sixth selection signal display area 510 is the client selection signal of the client 23. Further, a signal to be displayed in the sixth selection signal display area 510 is set as a signal to be outputted (distributed) to the distribution receiver device 30 as a server selection signal through the distribution output unit 120. It should be noted that an audio signal can be also outputted by executing a processing similarly to the exemplary embodiment 1.

3. Specific Processing of Respective Elements (3-1. Delay Amount Determination and Signal Delay Processing)

The exemplary embodiment 2 is different from the exemplary embodiment 1 regarding the processing of determining the delay amount in the delay amount determining unit 130. The other processing such as the signal delay processing will be executed similarly to the exemplary embodiment 1. In the exemplary embodiment 1, the delay amounts of the signal group to be provided to the respective clients 21, 22 and 23 from the signal input unit 100 has been set to be sequentially increased. Compared to this, in the exemplary embodiment 2, the same delay amount is set for the clients parallel-aligned in a logical connection. For example, in the example of the logical connection in FIG. 17, the delay amounts are set for satisfying the relation "d1=d2<d3<dt", where the delay amounts of the delay adjusting units 101, 102 and 103 are respectively expressed as "d1", "d2" and "d3" while the delay amount of the distribution delay adjusting unit 110 is expressed as "dt".

(3-2. Determination of Server Selection Signal Information and Generation of Server Selection Signal)

In the exemplary embodiment 2, the processing of determining a piece of server selection signal information in the selection signal determining unit 135 will be executed similarly to the exemplary embodiment 1. For example, in the case of the logical connection in FIG. 17, a piece of server selection signal information is set to be a piece of client selection signal information of the client 23. Further, in the exemplary embodiment 2, a server selection signal can be also generated by executing a processing similarly to the exemplary embodiment 1. In the case of the logical connection of FIG. 17, the server selection signal will be the same as the client selection signal of the client 23 through the aforementioned processing.

Exemplary Embodiment 3

1. Configuration of Distribution System

An exemplary embodiment 3 is different from the exemplary embodiments 1 and 2 regarding the device configuration of the distribution system. The device configuration of the exemplary embodiment 3 is different from the device configurations of the exemplary embodiments 1 and 2 only regarding a device implementing respective blocks. Respective elements in the exemplary embodiment 3 execute the same processing as the corresponding elements in the exemplary embodiments 1 and 2. The exemplary embodiment 3 exemplifies a case that respective clients implement the processing executed by the delay adjusting units in the distribution server 10 of the exemplary embodiments 1 and 2. Through the configuration, it is possible to reduce load of the distribution server 11 according to the exemplary embodiment 3.

Figure 20:
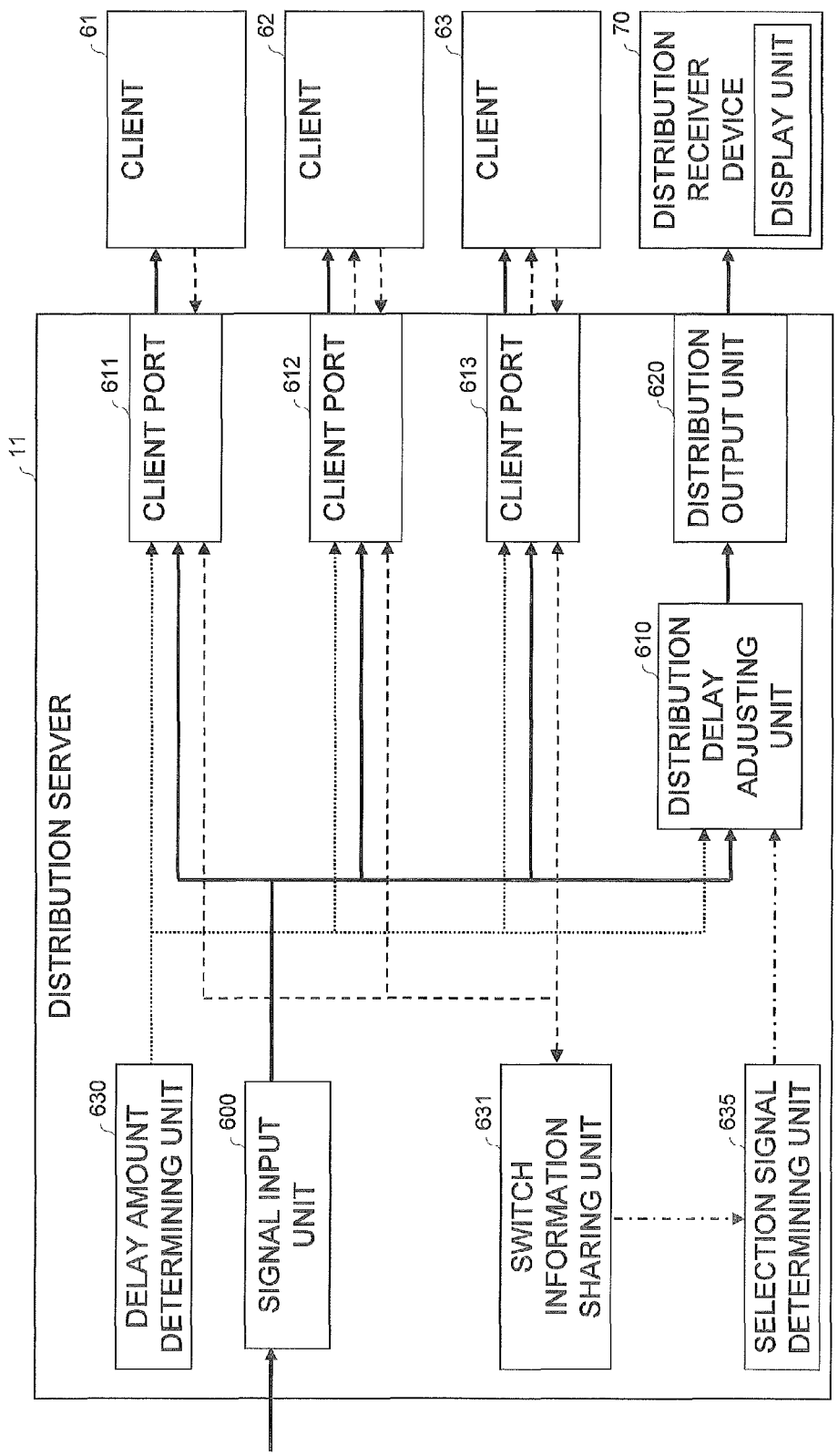
FIG. 20 is a block diagram showing a configuration of a distribution system in an exemplary embodiment 3.

FIG. 20 is a block diagram showing a configuration of a distribution system in the exemplary embodiment 3. As shown in FIG. 20, the distribution system in the exemplary embodiment 3 includes a distribution server 11, a plurality of clients 61, 62 and 63 and a distribution receiver device 70. The distribution server 11, the clients 61, 62 and 63 and the distribution receiver device 70 respectively correspond to the distribution server 10, the clients 21, 22 and 23 and the distribution receiver device 30 in the exemplary embodiments 1 and 2.

The distribution server 11 is formed by a signal input unit 600, a distribution delay adjusting unit 610, a plurality of client ports 611, 612 and 613, a distribution output unit 620, a delay amount determining unit 630, a switch information sharing unit 631 and a selection signal determining unit 635. The signal input unit 600, the distribution delay adjusting unit 610, the client ports 611, 612 and 613, the distribution output unit 620, the delay amount determining unit 630, the switch information sharing unit 631 and the selection signal determining unit 635 respectively correspond to the signal input unit 100, the distribution delay adjusting unit 110, the client ports 111, 112 and 113, the distribution output unit 120, the delay amount determining unit 130, the switch information sharing unit 131 and the selection signal determining unit 135 in the exemplary embodiments 1 and 2. Further, the distribution server 11 in the exemplary embodiment 3 is configured not to include the respective delay adjusting units 101, 102 and 103 in the exemplary embodiments 1 and 2.

Figure 21:
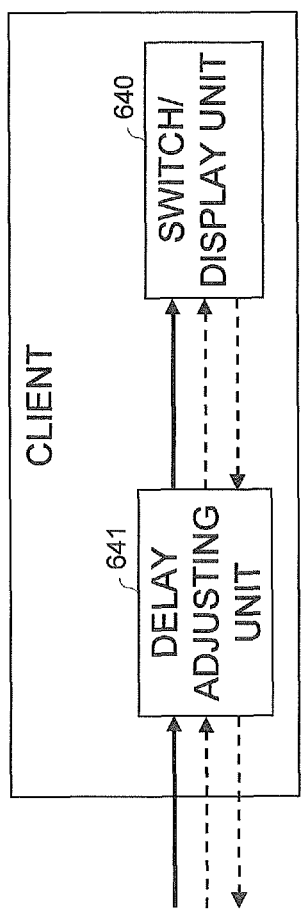
FIG. 21 is a block diagram showing a configuration of a client in the exemplary embodiment 3.

FIG. 21 is a block diagram showing a configuration of each of the clients 61, 62 and 63 in the exemplary embodiment 3. As shown in FIG. 21, each of the clients 61, 62 and 63 is formed by a delay adjusting unit 641 and a switch/display unit 640. The delay adjusting unit 641 corresponds to each of the delay adjusting units 101, 102 and 103 in the exemplary embodiments 1 and 2. Further, the switch/display unit 640 refers to the processing to be executed by each client in the exemplary embodiments 1 and 2. The delay adjusting unit 641 is provided with respective pieces of information and the signal group, which are provided to the each of the clients 61, 62 and 63, and is configured to execute a processing similar to that executed by each of the delay adjusting units 101, 102 and 103 in the exemplary embodiments 1 and 2. The delay adjusting unit 641 is then configured to provide the switch/display unit 640 with the signal group and the respective pieces of information, for which the delay processing was executed. The other processing will be executed similarly to the exemplary embodiments 1 and 2.

In the exemplary embodiment 3, the processing of each of the delay adjusting units 101, 102 and 103 in the exemplary embodiments 1 and 2 is moved to (i.e., configured to be executed in) each of the clients 61, 62 and 63. Therefore, the exemplary embodiment 3 is different from the exemplary embodiments 1 and 2 regarding transmission/receipt of information. In the exemplary embodiment 3, pieces of information, configured to be provided to the respective delay adjusting units 101, 102 and 103 from the respective elements in the exemplary embodiments 1 and 2, are configured to be provided to the respective clients 61, 62 and 63 through the respective client ports 611, 612 and 613.

Further, in the exemplary embodiment 3, pieces of information, configured to be provided from the respective delay adjusting units 101, 102 and 103 in the exemplary embodiments 1 and 2, are configured to be provided from the respective clients 61, 62 and 63 to the respective elements through the respective client ports 611, 612 and 613. Thus, the respective client ports 611, 612 and 613 are configured to provide the respective clients 61, 62 and 63 with the pieces of information supplied thereto from the respective elements of the distribution server 10, while being configured to provide the respective elements of the distribution server 10 with the pieces of information provided thereto from the respective clients 61, 62 and 63. The other processing in the respective blocks will be executed similarly to those in corresponding blocks of the exemplary embodiments 1 and 2.

INDUSTRIAL APPLICABILITY

A distribution system and a distribution server according to the present exemplary embodiments serve to remarkably enhance user's convenience in executing an editing task or a checking task in distribution by a plurality of workers, and therefore, are widely applicable to a switcher device, a distribution system that a distribution device, a distribution server and etc. are applied thereto, and so forth.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the distribution system and distribution server. Accordingly, these terms, as utilized to describe the technology disclosed herein should be interpreted relative to the distribution system and distribution server.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A distribution system formed by a plurality of clients configured to receive a plurality of channels of signals and a distribution server configured to output the plurality of channels of signals to the respective plurality of clients,
   each of the plurality of clients has a memory, a processor and further includes:
      a switch selecting the signal from the plurality of channels of signals and outputting the selected signal; and
      a transmitter transmitting selection information regarding the selected signal and dependent information indicating dependency among the plurality of clients to the distribution server, and the distribution server includes:
   a plurality of transceivers outputting the plurality of channels of signals to the respective plurality of clients and receiving the selection information and the dependent information from the respective plurality of clients;
   a delay amount determiner determining delay amount for transmission to be instructed to the respective plurality of transceivers based on the dependent information; and
   a delay adjuster controlling the delay amount for the respective plurality of transceivers based on the delay amount determined by the delay amount determiner.

2. The distribution system according to claim 1, wherein the distribution server further includes:
   a switch sharer holding the selection information to be provided thereto from the respective plurality of transceivers;
   a signal determiner determining an output signal based on the selection information held by the switch sharer; and
   a distribution outputter distributing the output signal determined by the signal determiner.

3. The distribution system according to claim 2, wherein the distribution server causes each of the plurality of transceivers to output the selection information of another client held by the switch sharer, the another client being at least one of the plurality of clients except for a relevant client, and
   the relevant client causes the switch to determine a signal outputted therefrom based on the selection information of the another client.

4. The distribution system according to claim 3, wherein the distribution server further causes each of the plurality of transceivers to: determine a clock time for switching the signal based on the delay amount determined by the delay amount determiner, and output information for switching the signal at the clock time to the relevant client, and
   each of the plurality of clients causes the switch to determine the signal outputted therefrom based on the information for switching the signal at the clock time.

5. The distribution system according to claim 3, wherein the distribution server causes each of the plurality of transceivers to: determine a clock time for switching the signal based on the delay amount determined by the delay amount determiner; and output information including the clock time, and
   each of the plurality of clients causes the switch to determine the signal outputted therefrom based on the clock time of the information.

6. The distribution system according to claim 1, wherein the plurality of channels of signals include at least one of either a video signal or an audio signal.

7. A distribution server, comprising:
   a plurality of transceivers outputting a plurality of channels of signals to each of a plurality of clients and receiving selection information for selecting at least one signal from the plurality of channels of signals and dependent information indicating dependency among the plurality of clients from the respective plurality of clients, each client including a memory, a processor, and a switch;
   a delay amount determiner determining delay amount for transmission to be instructed to the respective plurality of transceivers based on the dependent information;
   a delay adjuster controlling the delay amount for the respective plurality of transceivers based on the delay amount determined by the delay amount determiner; and
   a signal determiner determining an output signal based on the selection information to be provided thereto from the respective plurality of transceivers.

8. The distribution server according to claim 7, further comprising:
   a switch sharer holding the selection information to be provided thereto from the respective plurality of transceivers; and
   a distribution outputter distributing the output signal, wherein
   the signal determiner determines the output signal based on the selection information held by the switch sharer, and
   the distribution outputter distributes the output signal determined by the signal determiner.

9. The distribution server according to claim 8, wherein each of the plurality of transceivers outputs the selection information of another client held by the switch sharer, the another client being at least one of the plurality of clients except for a relevant client.

10. The distribution server according to claim 9, wherein each of the plurality of transceivers determines a clock time for switching the signal based on the delay amount determined by the delay amount determiner and output information for switching the signal at the clock time to the relevant client.

11. The distribution server recited in claim 9, wherein each of the plurality of transceivers determines a clock time for switching the signal based on the delay amount determined by the delay amount determiner and output information including the clock time.

12. The distribution server according to claim 7, wherein the plurality of channels of signals include at least one of either a video signal or an audio signal.

13. A distribution system comprising: a plurality of clients, the plurality of clients receiving a plurality of channels of signals and a distribution server outputting the plurality of channels of signals to the respective plurality of clients,
   the distribution server includes:
      a plurality of transceivers outputting the plurality of channels of signals to the respective plurality of clients and receiving selection information regarding one selected from the plurality of channels of signals and dependent information indicating dependency among the plurality of clients from the respective plurality of clients; and
      a delay amount determiner determining delay amounts for transmission of the respective plurality of transceivers based on the dependent information to be provided thereto from the respective plurality of transceivers, and
   each of the plurality of clients has a memory, a processor and further includes:

a switch selecting at least one signal from the plurality of channels of signals and output the selected signal; and a transmitter transmitting the selection information and the dependent information to the distribution server, and a delay adjuster controlling delay amount for the respective plurality of clients based on the delay amounts determined by the delay amount determiner.

14. The distribution system according to claim 13, wherein the distribution server further includes:

a switch sharer holding the selection information to be provided thereto from the respective plurality of clients;

a signal determiner determining an output signal based on the selection information held by the switch sharer; and a distribution outputter distributing the output signal determined by the signal determiner.

15. The distribution system according to claim 14, wherein the distribution server causes each of the plurality of transceivers to output the selection information of another client held by the switch sharer, the another client being at least one of the plurality of clients except for a relevant client, and each of the plurality of clients causes the switch to determine a signal outputted therefrom based on the selection information of the another client.

* * * * *